United States Patent
Tsurumi

(10) Patent No.: US 9,344,760 B2
(45) Date of Patent: *May 17, 2016

(54) INFORMATION PROCESSING APPARATUS, INFORMATION PROCESSING METHOD, AND PROGRAM

(71) Applicant: Sony Corporation, Tokyo (JP)

(72) Inventor: Shingo Tsurumi, Saitama (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/600,789

(22) Filed: Jan. 20, 2015

(65) Prior Publication Data

US 2015/0135203 A1    May 14, 2015

Related U.S. Application Data

(63) Continuation of application No. 13/359,910, filed on Jan. 27, 2012, now Pat. No. 8,966,514.

(30) Foreign Application Priority Data

Mar. 4, 2011    (JP) ................................ 2011-047891

(51) Int. Cl.
*H04N 21/442* (2011.01)
*H04N 21/25* (2011.01)
(Continued)

(52) U.S. Cl.
CPC ....... *H04N 21/44218* (2013.01); *H04N 21/251* (2013.01); *H04N 21/25875* (2013.01); *H04N 21/25891* (2013.01); *H04N 21/4415* (2013.01); *H04N 21/44222* (2013.01); *H04N 21/4532* (2013.01); *H04N 21/6547* (2013.01); *H04N 21/6582* (2013.01); *H04N 21/84* (2013.01); *H04N 21/8549* (2013.01); *H04N 21/4755* (2013.01)

(58) Field of Classification Search
CPC .................... H04N 21/44218; H04N 21/4532; H04N 21/251; H04N 21/25891; H04N 21/44222
See application file for complete search history.

(56) References Cited

U.S. PATENT DOCUMENTS

| 7,490,342 B2 * | 2/2009 | Echigo | ................... | H04L 29/06 725/120 |
| 2003/0093793 A1 * | 5/2003 | Gutta | ..................... | H04N 7/163 725/46 |

(Continued)

FOREIGN PATENT DOCUMENTS

| JP | 2006-333451 | 12/2006 |
| JP | 2010-266880 | 11/2010 |
| WO | WO 2010/070882 A1 | 6/2010 |

*Primary Examiner* — Olugbenga Idowu
(74) *Attorney, Agent, or Firm* — Oblon, McClelland, Maier & Neustadt, L.L.P.

(57) ABSTRACT

Provided is an information processing apparatus including a communication unit for receiving, from an external device, degree-of-attention information including information on a degree of attention, for each part of first content, calculated based on a state of viewing of a user, and a priority information generation unit for generating, using the degree-of-attention information, priority information including information on a priority for viewing for each part of second content. The communication unit transmits the priority information to the external device.

13 Claims, 17 Drawing Sheets

(51) Int. Cl.
*H04N 21/258* (2011.01)
*H04N 21/4415* (2011.01)
*H04N 21/6547* (2011.01)
*H04N 21/658* (2011.01)
*H04N 21/84* (2011.01)
*H04N 21/8549* (2011.01)
*H04N 21/45* (2011.01)
*H04N 21/475* (2011.01)

(56) References Cited

U.S. PATENT DOCUMENTS

2008/0189733 A1* 8/2008 Apostolopoulos . H04N 7/17318
　　　　　　　　　　　　　　　　　　　　　725/28
2012/0124604 A1* 5/2012 Small ................ H04N 21/4223
　　　　　　　　　　　　　　　　　　　　　725/12

* cited by examiner

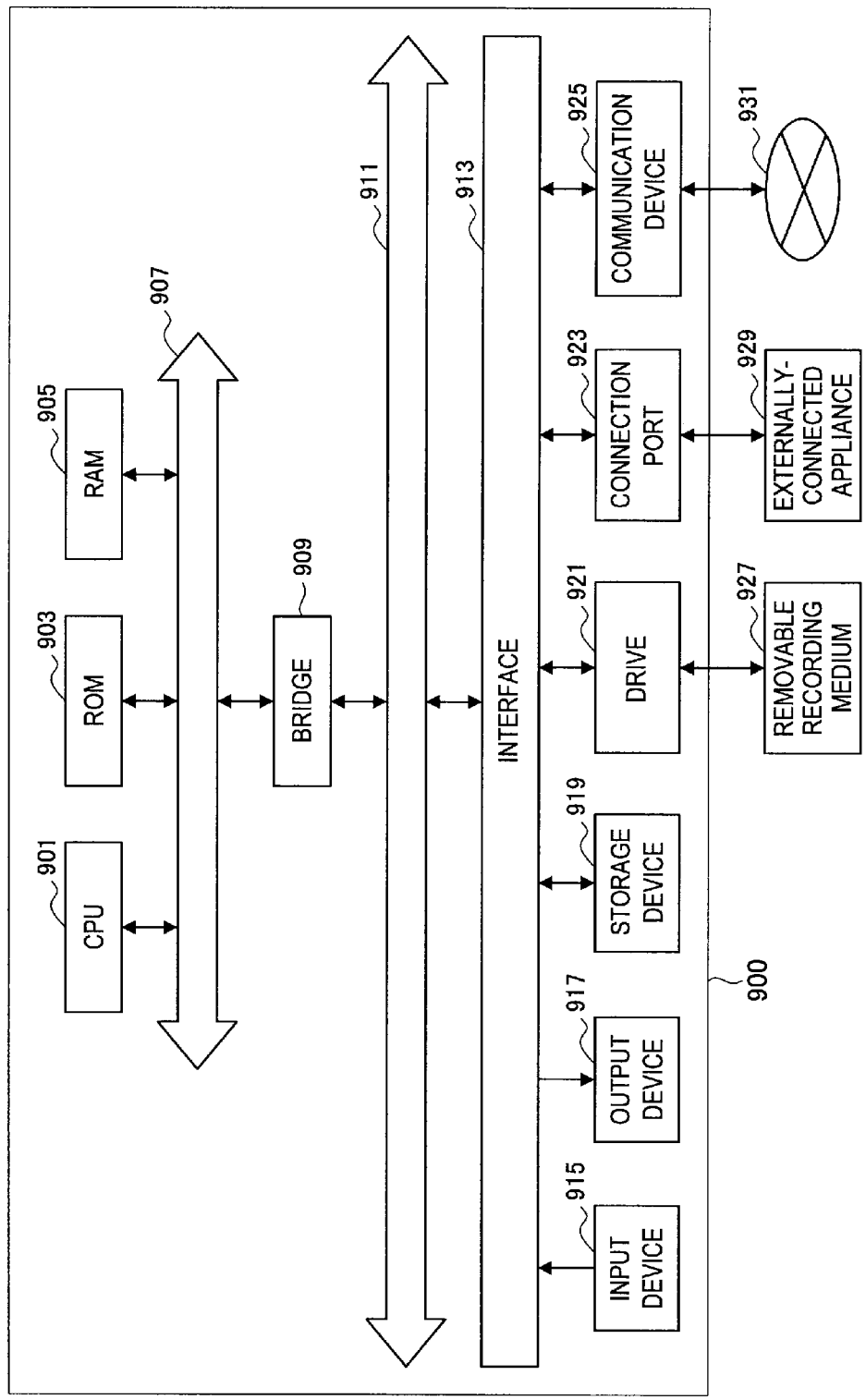

INFORMATION PROCESSING APPARATUS, INFORMATION PROCESSING METHOD, AND PROGRAM

CROSS-REFERENCE TO RELATED APPLICATIONS

The present application is a continuation application of and claims the benefit or priority under 35 U.S.C. §120 from U.S. application Ser. No. 13/359,910, filed Jan. 27, 2012, which contains subject matter related to that disclosed in Japanese Priority Patent Application JP 2011-047891, filed in the Japan Patent Office on Mar. 4, 2011, the entire contents of both of which are hereby incorporated by reference.

BACKGROUND

The present disclosure relates to an information processing apparatus, an information processing method, and a program.

In many cases, a user viewing content provided by TV broadcast, streaming broadcast using the Internet, or the like views the content within a limited time. Therefore, the user may not have enough time to view the entire content. On the other hand, parts of the content are not necessarily arranged in the order of interest of the user. Thus, for many users, to view the content from the start in proper order possibly means missing out on parts they are highly interested in, and is not logical.

Thus, a technology is being developed that sets priorities, reflecting degrees of interest of a user, for respective parts of content, and that automatically extracts a part with a high priority and provides the same to the user. For example, JP 2010-266880A describes a technology of assuming, with respect to content such as a sports broadcast, a part where audio information indicates a loud cheer as a climax part, creating a digest by automatically extracting the climax parts, and providing the digest to a user. The user is thereby enabled to selectively view the climax parts of content within a limited time, and effectively use the time.

SUMMARY

However, the degree of interest of a user for each part of content is not necessarily estimated based on a cheer. For example, content other than sports broadcast, such as news, seldom includes cheers in audio information. Thus, it is difficult, with respect to such content, to set priorities for respective parts by the technology described in JP 2010-266880A.

Accordingly, a technology of acquiring, for a greater variety of content, priorities, reflecting the degrees of interest of a user, for respective parts of content is desired.

According to the present disclosure, there is provided an information processing apparatus which includes a communication unit for receiving, from an external device, degree-of-attention information including information on a degree of attention, for each part of first content, calculated based on a state of viewing of a user, and a priority information generation unit for generating, using the degree-of-attention information, priority information including information on a priority for viewing for each part of second content. The communication unit transmits the priority information to the external device.

Furthermore, according to the present disclosure, there is provided an information processing apparatus which includes a degree-of-attention information generation unit for generating degree-of-attention information including information on a degree of attention, for each part of first content, calculated based on a state of viewing of a user, and a communication unit for transmitting the degree-of-attention information to an external device, and receiving, from the external device, priority information, including information on a priority for viewing for each part of second content, generated using the degree-of-attention information.

Furthermore, according to the present disclosure, there is provided an information processing method which includes receiving, from an external device, degree-of-attention information including information on a degree of attention, for each part of first content, calculated based on a state of viewing of a user, generating, using the degree-of-attention information, priority information including information on a priority for viewing for each part of second content, and transmitting the priority information to the external device.

Furthermore, according to the present disclosure, there is provided an information processing method which includes generating degree-of-attention information including information on a degree of attention, for each part of first content, calculated based on a state of viewing of a user, transmitting the degree-of-attention information to an external device, and receiving, from the external device, priority information, including information on a priority for viewing for each part of second content, generated using the degree-of-attention information.

Furthermore, according to the present disclosure, there is provided a program for causing a computer to function as a communication unit for receiving, from an external device, degree-of-attention information including information on a degree of attention, for each part of first content, calculated based on a state of viewing of a user, and a priority information generation unit for generating, using the degree-of-attention information, priority information including information on a priority for viewing for each part of second content. The communication unit transmits the priority information to the external device.

Furthermore, according to the present disclosure, there is provided a program for causing a computer to function as a degree-of-attention information generation unit for generating degree-of-attention information including information on a degree of attention, for each part of first content, calculated based on a state of viewing of a user, and a communication unit for transmitting the degree-of-attention information to an external device, and receiving, from the external device, priority information, including information on a priority for viewing for each part of second content, generated using the degree-of-attention information.

According to the present disclosure, the priority for viewing for each part of content may be calculated using degree-of-attention information for each part of another piece of content, for example.

According to the present disclosure described above, priorities, reflecting the degrees of interest of a user, for respective parts of content can be acquired for a greater variety of content.

BRIEF DESCRIPTION OF THE DRAWINGS

FIG. 17 is a block diagram for describing a hardware configuration of an information processing apparatus according to each embodiment of the present disclosure.

DETAILED DESCRIPTION OF THE EMBODIMENT(S)

Figure 1:
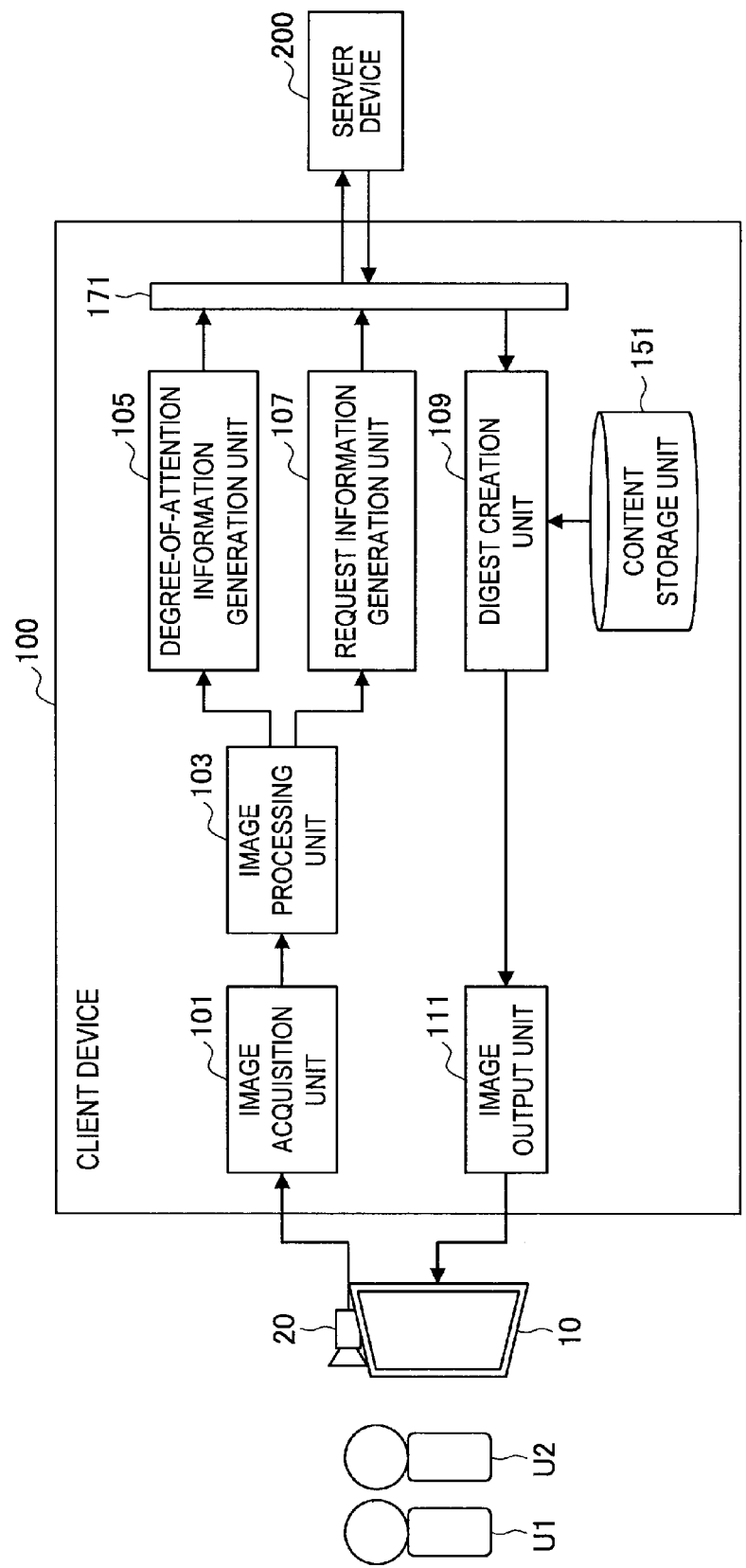
FIG. 1 is a block diagram showing a functional configuration of a client device according to a first embodiment of the present disclosure.

Hereinafter, preferred embodiments of the present disclosure will be described in detail with reference to the appended drawings. Note that, in this specification and the appended drawings, structural elements that have substantially the same function and configuration are denoted with the same reference numerals, and repeated explanation of these structural elements is omitted.

Additionally, the explanation will be given in the following order.

1. First Embodiment
1-1. Functional Configuration
1-2. Process Flow
1-3. Degree-of-Attention Calculation Process
1-4. Priority Calculation Process
1-5. Digest Content Creation Process
1-6. Modified Example
1-7. Summary
2. Second Embodiment
2-1. Functional Configuration
2-2. Process Flow
2-3. Modified Example
2-4. Summary
3. Hardware Configuration
4. Supplement

1. First Embodiment

According to a first embodiment of the present disclosure, a user views content using a client device 100 such as a DVD (Digital Versatile Disc) recorder or a Blu-Ray (registered trademark) recorder, for example. The client device 100 generates degree-of-attention information including information on the degree of attention for each part of content, based on the state of viewing of the user, and transmits the information to a service device 200. The server device 200 stores the received degree-of-attention information in a database.

Furthermore, the client device 100 generates request information requesting provision of priority information including information on priority for viewing for each part of content, and transmits the information to the server device 200. The server device 200 generates, in response to the received request information, priority information by using the degree-of-attention information stored in the database, and transmits the information to the client device 100. The client device 100 creates, using the received priority information, digest content obtained by extracting parts, of content, with high priorities, and provides it to the user.

1-1. Functional Configuration (Client Device)

First, a schematic functional configuration of the client device 100 according to the first embodiment of the present disclosure will be described with reference to FIG. 1. FIG. 1 is a block diagram showing a functional configuration of the client device 100.

The client device 100 is an example of an information processing apparatus according to the present disclosure, and includes an image acquisition unit 101, an image processing unit 103, a degree-of-attention information generation unit 105, a request information generation unit 107, a digest creation unit 109, an image output unit 111, a content storage unit 151 and a communication unit 171. The client device 100 is realized as a content recording/playback device such as a DVD recorder or a Blu-ray (registered trademark) recorder, for example. The client device 100 may also be realized as a TV receiver that is incorporated with a display device 10 and a camera 20, or a PC (Personal Computer), for example.

The image acquisition unit 101 is realized by a CPU (Central Processing Unit), a ROM (Read Only Memory), a RAM (Random Access Memory) and a communication device, for example. The image acquisition unit 101 acquires an image of users U1 and U2 who are viewing content using the display device 10 from the camera 20 connected to the client device 100. Additionally, there may be several users as shown in the drawing or there may be one user. The image acquired by the image acquisition unit 101 includes the faces of the users U1 and U2, for example. The image acquisition unit 101 provides information on the acquired image to the image processing unit 103.

The image processing unit 103 is realized by a CPU, a GPU (Graphics Processing Unit), a ROM and a RAM, for example. The image processing unit 103 processes the information on the image acquired from the image acquisition unit 101 by filtering or the like, and acquires information regarding the users U1 and U2. For example, the image processing unit 103 recognises the users U1 and U2 based on images of the faces included in the image, and acquires user IDs. Also, the image processing unit 103 may acquire information regarding movements of the users U1 and U2, such as angles of the faces, closing of the eyes, gaze directions or the like. The image processing unit 103 provides the acquired information to the degree-of-attention information generation unit 105 and the request information generation unit 107. Additionally, a detailed functional configuration of the image processing unit 103 will be described later.

The degree-of-attention information generation unit 105 is realized by a CPU, a ROM and a RAM, for example. The degree-of-attention information generation unit 105 calculates, based on the information regarding the movement of a user acquired from the image processing unit 103, the degree of attention for each part of content, and generates degree-of-attention information including information on the degree of attention which has been calculated. Here, the movement of a user is an example of a state of viewing of the user. The degree-of-attention information includes information for specifying a user and content. The information for specifying a user may be the user ID acquired by the image processing unit 103. The degree-of-attention information which has been generated is provided to the communication unit 171, and is transmitted from the communication unit 171 to the server device 200. Additionally, a concrete example of calculation of the degree of attention will be described later.

The request information generation unit 107 is realized by a CPU, a ROM and a RAM, for example. The request information generation unit 107 generates the request information requesting provision of the priority information, by using the information provided by the image processing unit 103. The request information includes information on a subject user. The information on a subject user may be the user ID acquired by the image processing unit 103, for example. Also, the request information generation unit 107 may generate the request information taking, as the subject user, an arbitrary user specified by an operation of a user that is acquired via an input device of the client device 100. The request information further includes information for specifying subject content of the priority information. The subject content is specified by an operation of a user that is acquired via the input device of the client device 100, for example. The request information which has been generated is provided to the communication unit 171, and is transmitted from the communication unit 171 to the server device 200.

The communication unit 171 is realized by a connection port and a communication device, for example. The communication unit 171 communicates with the server device 200, and transmits the degree-of-attention information generated by the degree-of-attention information generation unit 105 and the request information generated by the request information generation unit 107. Furthermore, the communication unit 171 receives the priority information from the server device 200. The priority information is information including information on the priority for viewing, for each part of content, of a subject user specified by the request information. The communication unit 171 provides the received priority information to the digest creation unit 109.

The content storage unit 151 is realized by a ROM, a RAM and a storage device, for example. Data of content that the client device 100 provides to a user is stored in the content storage unit 151. The data of content may be acquired from airwaves by using a tuner that is not shown in the drawing, or may be downloaded from a communication network via a communication device. The content storage unit 151 provides the data of content to the digest creation unit 109 and the image output unit 111.

The digest creation unit 109 is realized by a CPU, a ROM and a RAM, for example. The digest creation unit 109 acquires the priority information that the communication unit 171 has received from the server device 200 and extracts a part, of the content, whose degree of priority is a predetermined value or higher by using the priority information which has been acquired, and thereby creates digest content. The digest creation unit 109 acquires content data of the subject content of the priority information from the content storage unit 151. Also, the digest creation unit 109 provides data of the created digest content to the image output unit 111.

Here, for example, the digest creation unit 109 may automatically create the digest content in a case the priority information is provided by the communication unit 171. Also, the digest creation unit 109 may create the digest content according to an operation of a user that is acquired via the input device of the client device 100. In this case, the digest creation unit 109 may also be able to create a plurality of types of digest content, depending on the designated length of digest content, for example.

The image output unit 111 is realized by a CPU, a GPU, a ROM, and a RAM, for example. The image output unit 111 outputs data of the digest content provided by the digest creation unit 109 to the display device 10 connected to the client device 100. The image output unit 111 may also acquire data of normal content that is not digest content from the content storage unit 151 and output it to the display device 10. Furthermore, the image output unit 111 may also output, to the display device 10, an image of an operation screen that is used by a user to operate the client device 100. The operation screen may also present the priority information acquired by the communication unit 171 to a user, for example.

(Details of Image Processing Unit)

Figure 2:
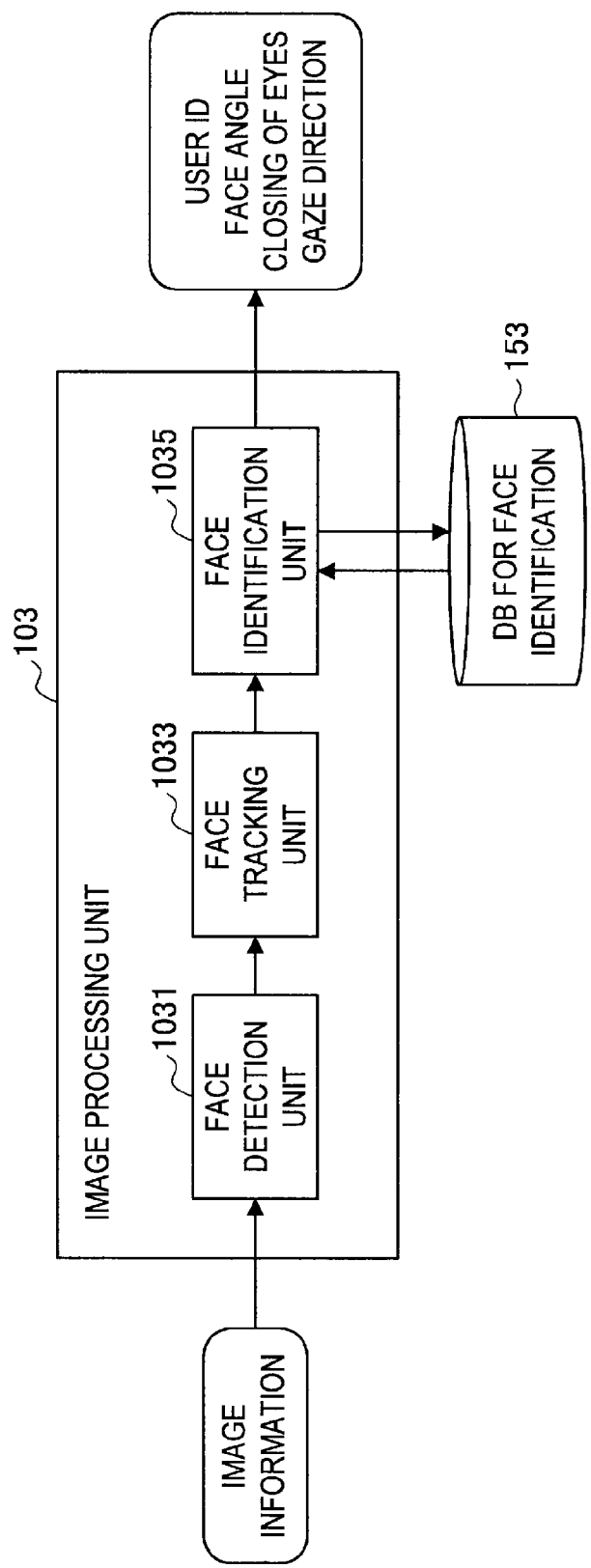
FIG. 2 is a block diagram showing a functional configuration of an image processing unit of the client device according to the first embodiment of the present disclosure.

Next, a functional configuration of the image processing unit 103 of the client device 100 will be further described with reference to FIG. 2. FIG. 2 is a block diagram showing the functional configuration of the image processing unit 103.

The image processing unit 103 includes a face detection unit 1031, a face tracking unit 1033 and a face identification unit 1035. The face identification unit 1035 refers to a DB 153 for face identification. The image processing unit 103 acquires image data from the image acquisition unit 101. Also, the image processing unit 103 provides a user ID for identifying a user and information regarding a user such as the angle of the face, closing of the eyes, gaze direction or the like to the degree-of-attention information generation unit 105 or the request information generation unit 107.

The face detection unit 1031 is realized by a CPU, a GPU, a ROM and a RAM, for example. The face detection unit 1031 refers to the image data acquired from the image acquisition unit 101, and detects a face of a person included in the image. If a face is included in the image, the face detection unit 1031 detects the position, the size or the like of the face. Furthermore, the face detection unit 1031 detects the state of the face shown by the image. For example, the face detection unit 1031 detects a state such as the angle of the face, whether the eyes are closed or not, or the gaze direction. Additionally, any known technology, such as those described in JP 2007-65766A and JP 2005-44330A, can be applied to the processing of the face detection unit 1031.

The face tracking unit 1033 is realized by a CPU, a GPU, a ROM and a RAM, for example. The face tracking unit 1033 tracks the face detected by the face detection unit 1031 over pieces of image data of different frames acquired from the image acquisition unit 101. The face tracking unit 1033 uses similarity or the like between patterns of the pieces of image data of the face detected by the face detection unit 1031, and searches for a portion corresponding to the face in a following frame. By this processing of the face tracking unit 1033, faces included in images of a plurality of frames can be recognized as a change over time of the face of a same user.

The face identification unit 1035 is realized by a CPU, a GPU, a ROM and a RAM, for example. The face identification unit 1035 is a processing unit for performing identification as to which user's face a face detected by the face detection unit 1031 is. The face identification unit 1035 calculates a local feature by focusing on a characteristic portion or the like of the face detected by the face detection unit 1031 and compares the local feature which has been calculated and a local feature of a face image of a user stored in advance in the DB 153 for face identification, and thereby identifies the face detected by the face detection unit 1031 and specifies the user ID of the user corresponding to the face. Additionally, any know technology, such as those described in JP 2007-65766A and JP 2005-44330A, can be applied to the processing of the face identification unit 1035.

The DB 153 for face identification is realized by a ROM, a RAM and a storage device, for example. A local feature of a face image of a user is stored in advance in the DB 153 for face identification in association with a user ID, for example. The local feature of a face image of a user stored in the DB 153 for face identification is referred to by the face identification unit 1035.

(Server Device)

Figure 3:
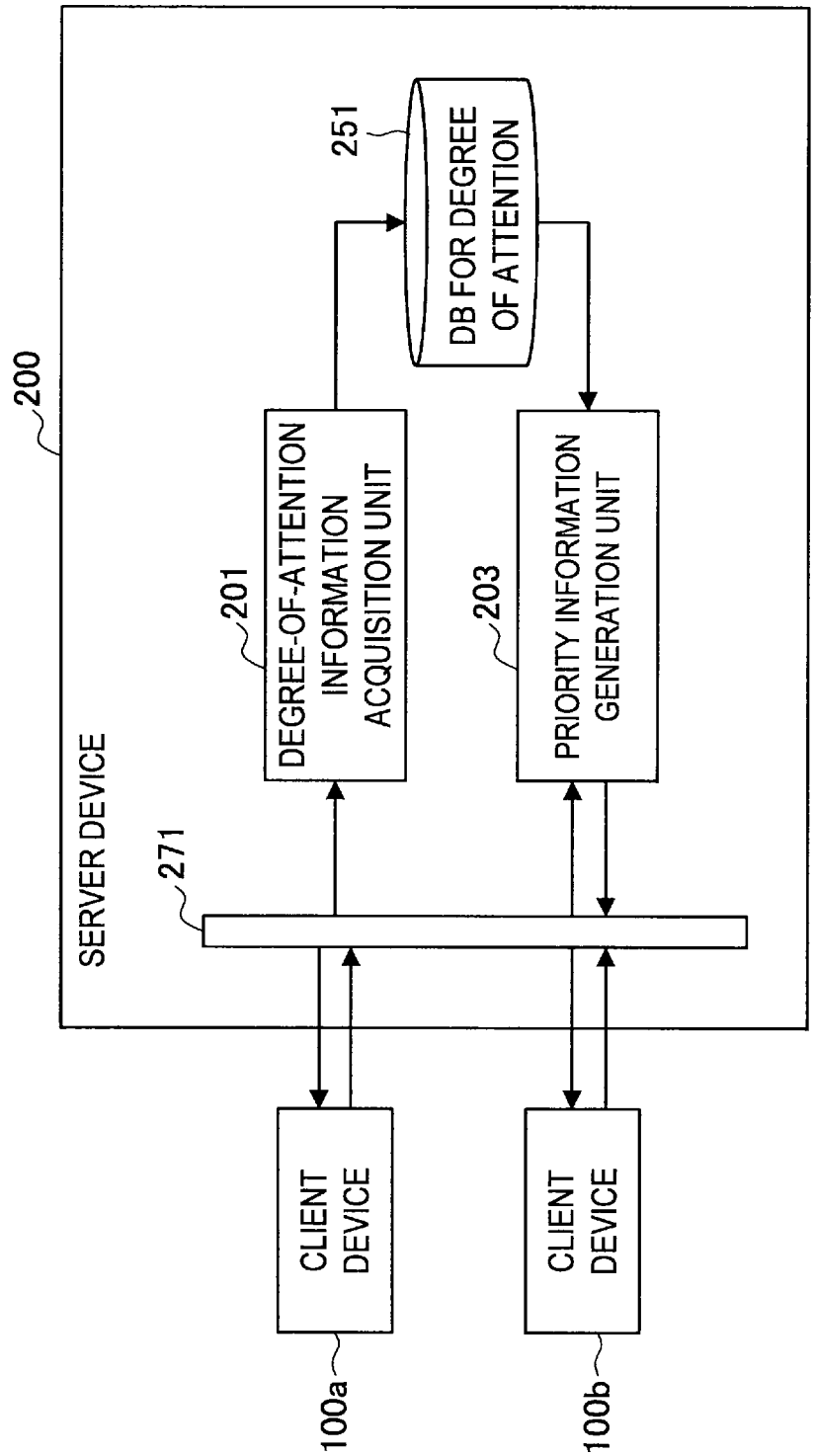
FIG. 3 is a block diagram showing a functional configuration of a server device according to the first embodiment of the present disclosure.

Next, a schematic functional configuration of the server device 200 according to the first embodiment of the present disclosure will be described with reference to FIG. 3. FIG. 3 is a block diagram showing a functional configuration of the server device 200.

The server device 200 is an example of an information processing apparatus according to the present disclosure, and includes a degree-of-attention information acquisition unit 201, a priority information generation unit 203, a DB 251 for degree of attention, and a communication unit 271. The server device 200 is realized as a content information providing server installed on a communication network, for example. Additionally, the server device 200 may be realized as a single device or may be realized as a collection of functions provided by resources distributed on a network.

The communication unit 271 is realized by a connection port and a communication device, for example. The communication unit 271 communicates with the client device 100, and receives degree-of-attention information and request information generated by the client device 100. The degree-of-attention information is provided to the degree-of-attention information acquisition unit 201, and the request information is provided to the priority information generation unit 203. Also, the communication unit 271 transmits priority information generated by the priority information generation unit 203 to the client device 100. Additionally, the client device 100 with which the communication unit 271 communicates may be more than one, such as client devices 100a and 100b as shown in the drawing, or it may be only one device.

The degree-of-attention information acquisition unit 201 is realized by a CPU, a ROM and a RAM, for example. The degree-of-attention information acquisition unit 201 acquires the degree-of-attention information from the communication unit 271, and stores the acquired degree-of-attention information in the DB 251 for degree of attention. The degree-of-attention information acquisition unit 201 stores the acquired degree of attention in the DB 251 for degree of attention in association with a user and content. Here, the communication unit 271 may receive the degree-of-attention information from a plurality of client devices 100a and 100b, and each client device 100 may generate the degree-of-attention information for a plurality of users U1 and U2. Thus, the degree-of-attention information acquisition unit 201 may acquire, for one piece of content, the degree-of-attention information of a plurality of users and store the same in the DB 251 for degree of attention.

The priority information generation unit 203 is realized by a CPU, a ROM and a RAM, for example. The priority information generation unit 203 generates priority information including information on priority for viewing for each part of content by using the degree of attention stored in the DB 251 for degree of attention. The priority information generation unit 203 acquires request information from the communication unit 271, and generates the priority information in response to the acquired request information. Here, the request information includes information on a subject user of the priority information. Accordingly, the priority information generation unit 203 generates priority information including information on priority, for each part of content, of a subject user for viewing. The generated priority information is provided to the communication unit 271, and is provided by the communication unit 271 to the client device 100. Additionally, a concrete example of calculation of a priority will be described later.

The DB 251 for degree of attention is realized by a ROM, a RAM and a storage device, for example. The degree-of-attention information acquired by the degree-of-attention information acquisition unit 201 is stored in the DB 251 for degree of attention. As described above, the degree-of-attention information acquisition unit 201 may acquire the degree-of-attention information of a plurality of users for one piece of content. Thus, the degree-of-attention information of a plurality of users is stored in the DB 251 for degree of attention for each piece of content.

1-2. Process Flow

Figure 4:
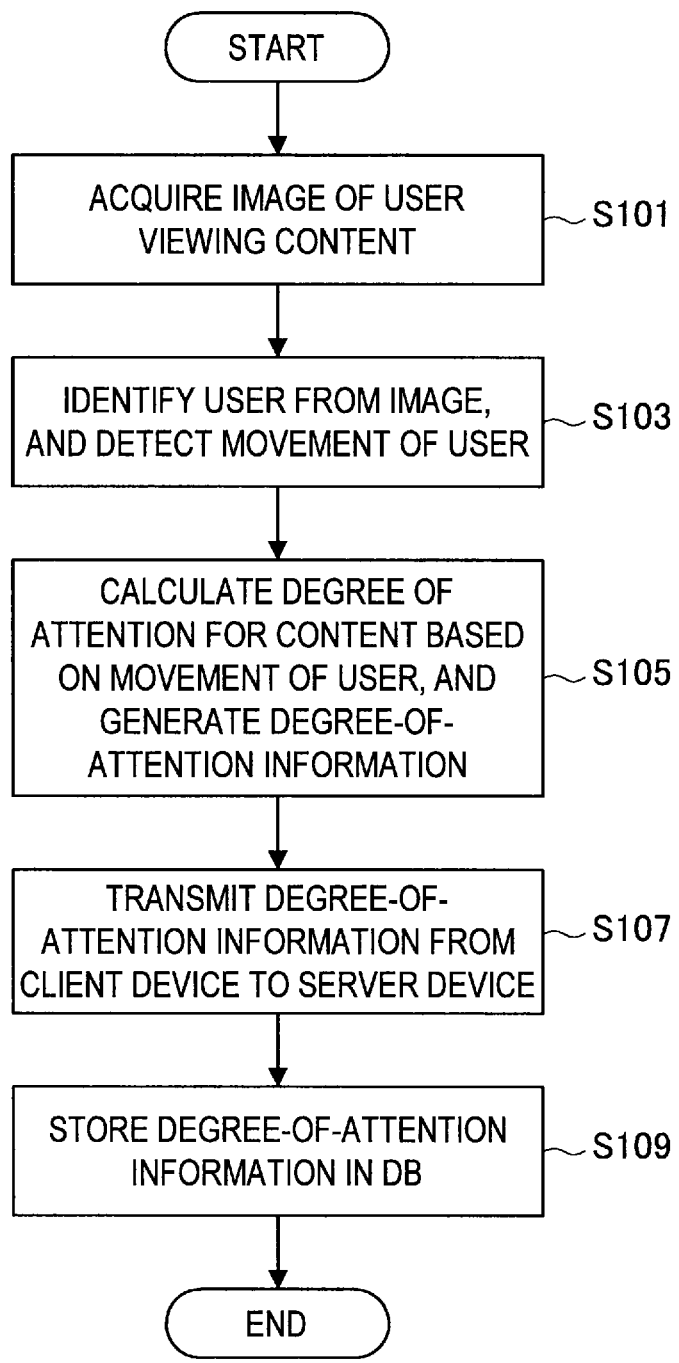
FIG. 4 is a flow chart showing an example of processing performed, in the first embodiment of the present disclosure, when normally viewing content.
Figure 5:
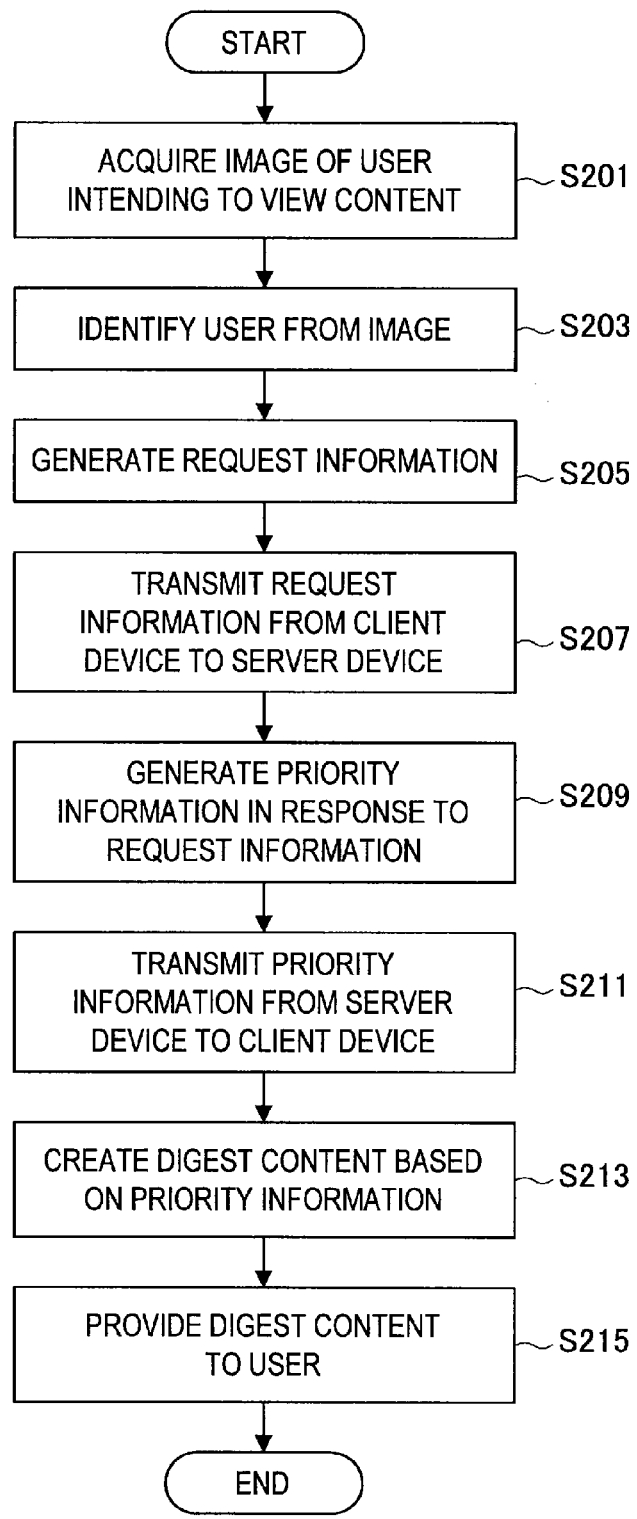
FIG. 5 is a flow chart showing an example of processing performed, in the first embodiment of the present disclosure, when digest viewing content.

Next, process flows of the first embodiment of the present disclosure will be described with reference to FIGS. 4 and 5. FIG. 4 is a flow chart showing an example of processing that is performed when a user views content in a normal manner using the client device 100. FIG. 5 is a flow chart showing an example of processing that is performed when a user views content in a digest manner using the client device 100.

(Process at the Time of Normal Viewing of Content)

Referring to FIG. 4, first, the image acquisition unit 101 of the client device 100 acquires an image of a user viewing content (step S101). In the present embodiment, the image acquisition unit 101 acquires the image of a user from the camera 20. Here, several users may be included in the acquired image.

Next, the image processing unit 103 of the client device 100 identifies a user from the image, and detects a movement of the user (step S103). Here, the image processing unit 103 identifies the user by detecting an image of a face included in the acquired image. Also, the image processing unit 103 acquires, from the acquired image, information regarding a movement, such as the angle of the face of the user, closing of the eyes, the gaze direction and the like.

Next, the degree-of-attention information generation unit 105 of the client device 100 calculates a degree of attention for each part of the content based on the movement of the user, and generates degree-of-attention information (step S105). Here, the degree-of-attention information generation unit 105 calculates the degree of attention based on the movement of the user. The degree-of-attention information includes, together with the degree of attention calculated for each part of the content which has been viewed by the user, content information for specifying the content which has been viewed by the user and a user ID for specifying the user.

Next, the communication unit 171 of the client device 100 transmits the generated degree-of-attention information to the server device 200 (step S107). The degree-of-attention information may be collectively transmitted from the client device 100 to the server device 200 after the user has finished viewing the content, or may be transmitted every time the degree of attention is calculated for a segment of the content, for example.

Next, the communication unit 271 of the server device 200 receives the degree-of-attention information from the client device 100, and the degree-of-attention information acquisition unit 201 acquires the received degree-of-attention information and stores the same in the DB 251 for degree of attention (step S109). The degree-of-attention information may be acquired for a plurality of pieces of content and for a plurality of users.

(Process at the Time of Digest Viewing of Content)

Referring to FIG. 5, first, the image acquisition unit 101 of the client device 100 acquires an image of a user intending to view digest content (step S201). In the present embodiment, the image acquisition unit 101 acquires an image of the user from the camera 20. Here, several users may be included in the acquired image. Content that a user is intending to view is specified by an operation of the user acquired via the input device of the client device 100, for example.

Next, the image processing unit 103 of the client device 100 identifies the user from the image (step S203). In the present embodiment, the image processing unit 103 identifies the user by detecting an image of a face included in the acquired image.

Subsequently, the request information generation unit 107 of the client device 100 generates the request information (step S205). The user ID of the user identified from the image is included in the request information as the user ID of a subject user. Further, content information specifying the content that the user is intending to view is also included in the request information.

Then, the communication unit 171 of the client device 100 transmits the request information to the server device 200 (step S207). The request information may be transmitted to the server device 200 by a separate operation of the user acquired via the input device of the client device 100, or may be automatically transmitted to the server device 200 by an operation of the user for content viewing, for example.

Next, the priority information generation unit 203 of the server device 200 acquires the request information from the client device 100 via the communication unit 271, and generates the priority information in response to the acquired request information (step S209). The priority information generation unit 203 uses the degree-of-attention information stored in the DB 251 for degree of attention for generation of the priority information. The priority included in the priority information that is generated here is the priority of the user specified by the user ID of the subject user included in the request information. Furthermore, the content which is the subject of the priority information is content that is specified by the content information included in the request information.

Next, the communication unit 271 of the server device 200 transmits the generated priority information to the client device 100 (step S211). In the present embodiment, the priority information is generated in response to the request information from the client device 100, and thus the generated priority information can be automatically transmitted to the client device 100.

Subsequently, the digest creation unit 109 of the client device 100 acquires the priority information from the server device 200 via the communication unit 171, and creates digest content based on the acquired priority information (step S213). The digest content here may be automatically created when priority information is acquired. Also, the digest content may be created according to conditions, such as a length specified by an operation of the user acquired via the input device of the client device 100.

Then, the image output unit 111 of the client device 100 outputs the digest content to the display device 10 and provides the same to the user (step S215).

1-3. Degree-of-Attention Calculation Process

Figure 6:
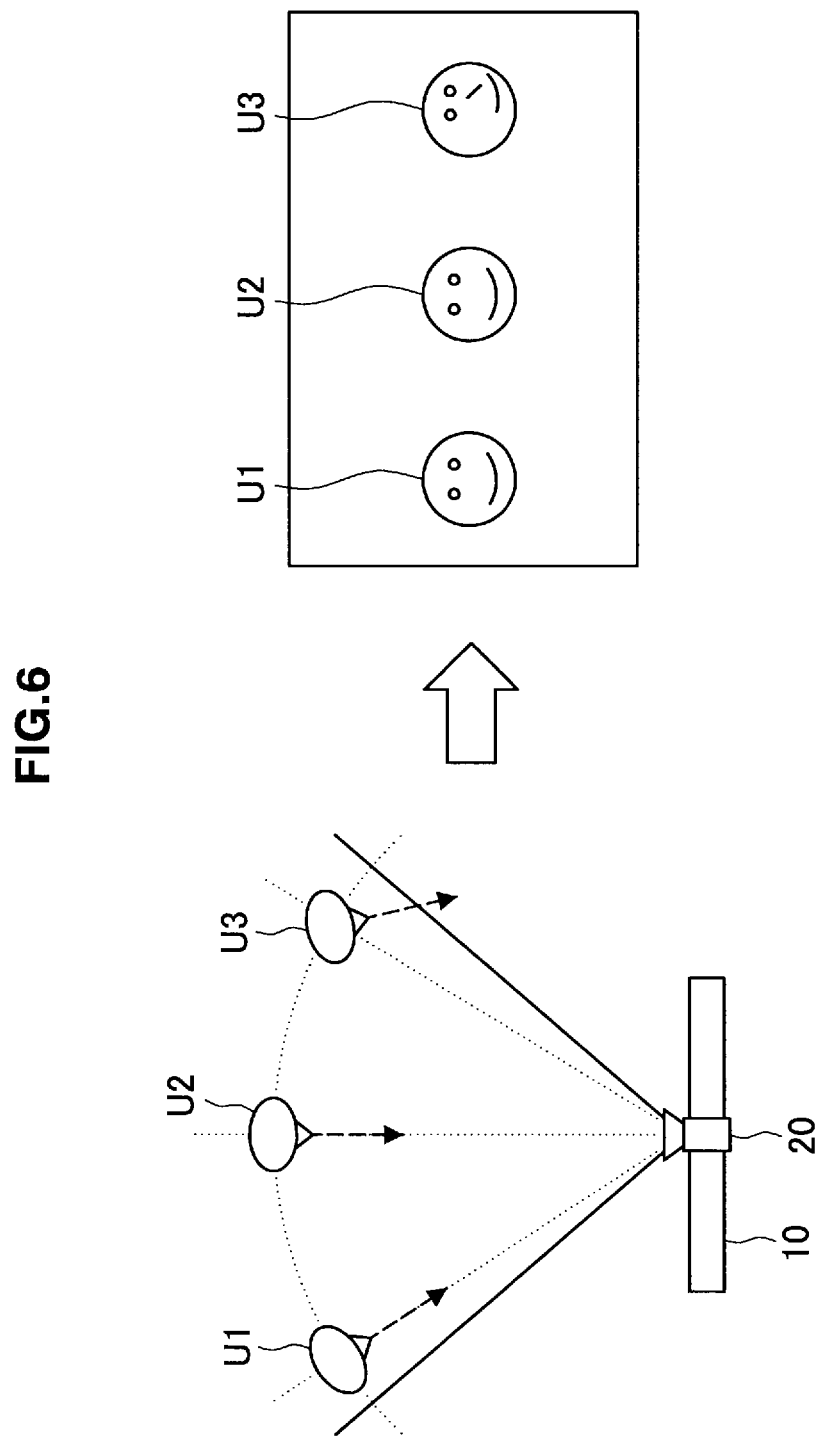
FIG. 6 is a diagram showing an example of calculation of a degree of attention in the first embodiment of the present disclosure.
Figure 7:
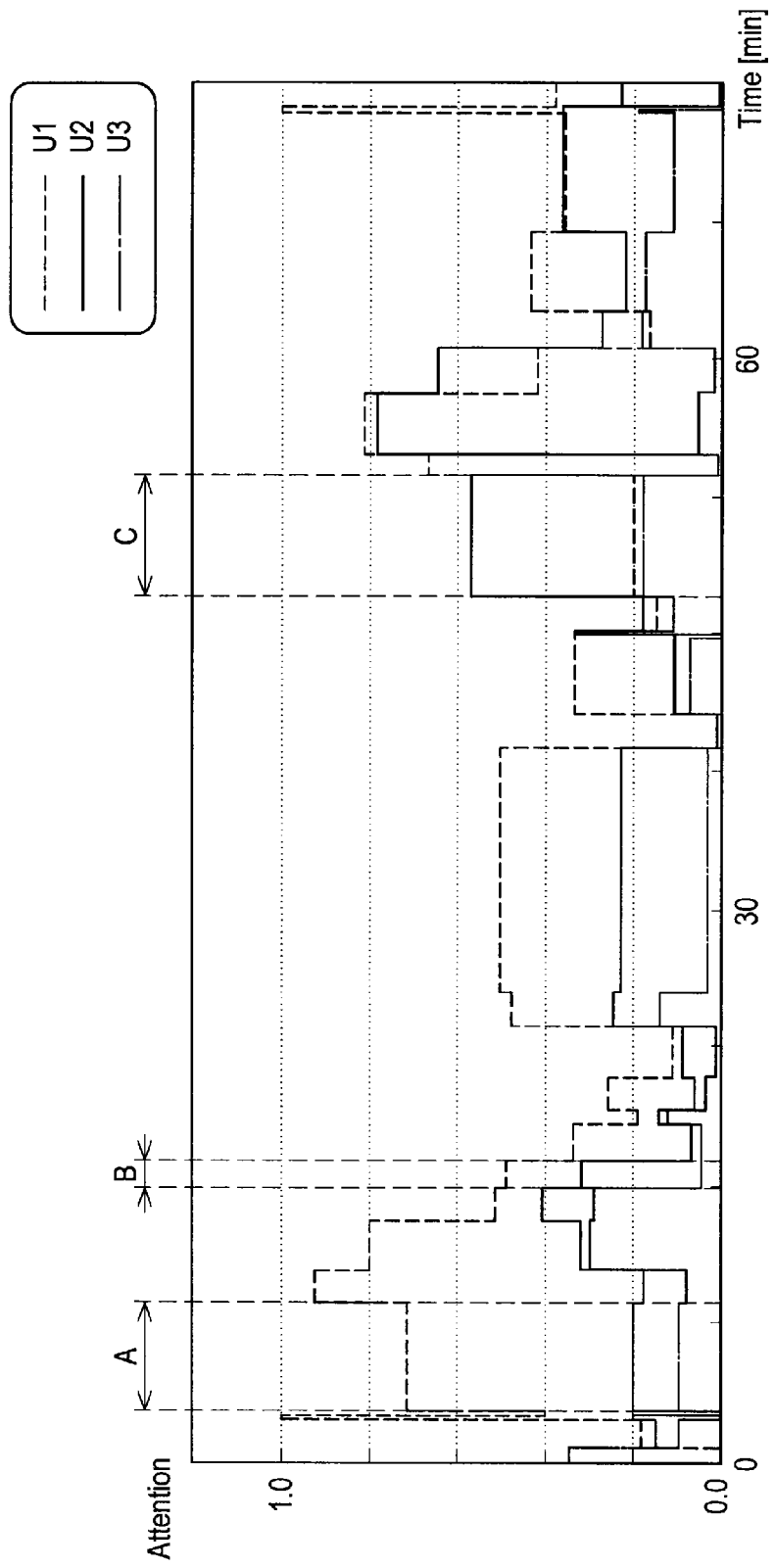
FIG. 7 is a diagram showing the degree of attention calculated in the example of FIG. 6.

Next, a degree-of-attention calculation process of the present embodiment will be described with reference to FIGS. 6 and 7. FIG. 6 is a diagram showing an example where a degree of attention is calculated based on movements of users U1 to U3 detected from an image of the users U1 to U3 viewing content. FIG. 7 is a diagram showing the degree of attention calculated, in the example of FIG. 6, for each part of the content.

Users U1 to U3, who are in the capturing range of the camera 20, are shown in FIG. 6. In this case, being the users viewing the content by using the display device 10, the users U1 to U3 are made the subjects of degree-of-attention calculation by the degree-of-attention information generation unit 105. The degree-of-attention information generation unit 105 calculates the degree of attention by using the information provided by the image processing unit 103. For example, the degree-of-attention information generation unit 105 determines that a user is paying attention to the display device 10 in a case the user is not closing his/her eyes and is looking in the direction of the display device 10. In the example shown in the drawing, none of the users U1 to U3 have their eyes closed. However, although the directions of the faces (or the directions of the gazes) of the users U1 and U2 match the direction of the display device 10, the direction of the face (or the direction of the gaze) of the user U3 does not match the direction of the display device 10. Thus, the degree-of-attention information generation unit 105 determines that the users U1 and U2 are paying attention to the content but the user U3 is not paying attention to the content.

The degrees of attention of the users U1 to U3 calculated in the example of FIG. 6 are shown in FIG. 7. For example, the degree-of-attention information generation unit 105 determines the degree of attention at one moment by a moving average over several seconds before and after the moment, taking a case where each user is paying attention to the content as "1" and a case where each user is not paying attention to the content as "0." Furthermore, the degree-of-attention information generation unit 105 averages the degree of attention on a per-content segment basis. The degree of attention thereby takes a fixed value for each segment of the content, as shown in the graph of FIG. 7. A segment of content is a part, within the content, with attributes that are relevant to a certain degree, such as a section in a broadcast program, for example. For example, referring to the graph of FIG. 7, it can be seen that the degree of attention of the user U1 is particularly high in segment A, the degree of attention of the user U3 is high only in segment B within the content, and the degree of attention of the user U2 is higher than the degree of attention of the user U1 in segment C.

1-4. Priority Calculation Process

Next, a priority calculation process of the present embodiment will be described. Any known technology, such as collaborative filtering or CBF (Contents Based Filtering), can be applied to calculation of a priority by the priority information generation unit 203. In the following, an example of the collaborative filtering will be described.

In this example, the priority information generation unit 203 calculates a priority of a user U1, who is the subject user in request information, with respect to content A. The user U1 here is a user who has yet to view the content A. In this case, the priority information generation unit 203 uses degree-of-attention information of other users U2 to U4 who have viewed the content A and calculates the priority of the user U1 for the content A.

The content A includes segments Seg1 to Seg5, and the degrees of attention of the users U1 to U4 for each segment are as shown in Table 1 below. Since the user U1 is not viewing the content A, the degree of attention of the user U1 is unknown. Additionally, the degree of attention in the following explanation is indicated by five levels, from 1 to 5, for the sake of simplicity.

TABLE 1

Degree of Attention for Content A

|    | Seg1 | Seg2 | Seg3 | Seg4 | Seg5 |
|----|------|------|------|------|------|
| U1 | ?    | ?    | ?    | ?    | ?    |
| U2 | 2    | 2    | 3    | 1    | 2    |
| U3 | 1    | 4    | 5    | 3    | 1    |
| U4 | 2    | 5    | 5    | 2    | 1    |

The priority information generation unit 203 calculates the degree of attention of the user U1 for each segment of the content A by using the degree of attention, for each segment of the content A, of a user, among the users U2 to U4, whose tendency of the distribution of the degree of attention is similar to that of the user U1. Accordingly, the priority information generation unit 203 uses the degree-of-attention information for content B, which is another piece of content that was viewed by all of the users U1 to U4.

The content B includes segments Seg1 to Seg6, and the degrees of attention of the users U1 to U4 for each segment are as shown in Table 2 below.

TABLE 2

Degree of Attention for Content B

|    | Seg1 | Seg2 | Seg3 | Seg4 | Seg5 | Seg6 |
|----|------|------|------|------|------|------|
| U1 | 5    | 2    | 5    | 1    | 2    | 4    |
| U2 | 1    | 5    | 3    | 4    | 5    | 2    |
| U3 | 5    | 2    | 4    | 2    | 2    | 5    |
| U4 | 4    | 1    | 4    | 1    | 2    | 4    |

The priority information generation unit 203 calculates, with respect to the content B, the similarity of the degree-of-attention distributions between the user U1 and each of the other users U2 to U4. A similarity $S_{UmUn}$ of the degree-of-attention distributions between a use Um and a user Un is calculated by the following formula 1. Additionally, $Am_i$ and $An_i$ are the degrees of attention, for an i-th segment Segi, of the user Um and the user Un, respectively. Also, $Am_{avg}$ and $An_{avg}$ are average values of the degree of attention, for each segment, of the user Um and the user Un, respectively.

$$S_{UmUn} = \frac{\sum_i (Am_i - Am_{avg})(An_i - An_{avg})}{\sqrt{\sum_i (Am_i - Am_{avg})^2} \sqrt{\sum_i (An_i - An_{avg})^2}} \quad \text{(Formula 1)}$$

As a result of calculation, the similarity $S_{U1U2}$ between the user U1 and the U2 is −0.81, the similarity $S_{U1U3}$ between the user U1 and the user U3 is 0.90, and the similarity $S_{U1U4}$ between the user U1 and the user U4 is 0.95. It can be seen from these results that, with respect to the content B, the tendencies of the distributions of the degrees of attention are contrasting between the user U1 and the user U2, but the tendencies of the distributions of the degrees of attention are similar for the user U1 and the user U3 and for the user U1 and the user U4. The tendencies of the distributions of the degrees of attention are determined to be similar when the similarity $S_{UmUn}$ is a predetermined threshold value or higher, for example.

Additionally, in the above example, an explanation has been given with respect to a single piece of content, but in a case there are a plurality of pieces of content which the users U1 to U4 all viewed, for example, the degrees of attention are serially arranged for the segments of each piece of content and the above formula 1 is applied, and the similarity $S_{UmUn}$ of the degree-of-attention distributions between the users is calculated.

The priority information generation unit 203 calculates the priority of the user U1 for the content A based on this result. To be specific, the priority information generation unit 203 uses, with respect to the content B, the degrees of attention, for the content A, of the users U3 and U4 whose tendencies regarding the segment to which attention is paid, that is, of the distributions of attention, are similar to that of the user U1. The priority of the user U1 for each segment of the content A is calculated by the following formula 2. Additionally, $A_i$ is the degree of attention of the user U1 for an i-th segment Segi. $A_{avg}$ is an average value of the degree of attention of the user U1 for a program which has been viewed by the user U1 as well as the users U2 to U4. Simil is a group of users whose distributions of the degree of attention for a program viewed in common are similar to that of the user U1, that is, a group of users whose degrees of attention are correlated with that of the user U1. J is each user included in the group Simil, and is, in this example, the users U3 and U4. $A_{Ji}$ is the degree of attention of a user J for the i-th segment Segi. $A_{Javg}$ is an average value of the degree of attention of the user J. $S_{AJ}$ is a similarity between the user U1 and the user J obtained by the above formula 1.

$$A_i = A_{avg} + \frac{\sum_{J \in Simil} (A_{Ji} - A_{Javg})S_{AJ}}{\sum_J |S_{AJ}|} \quad \text{(Formula 2)}$$

1-5. Digest Content Creation Process

Figure 8:
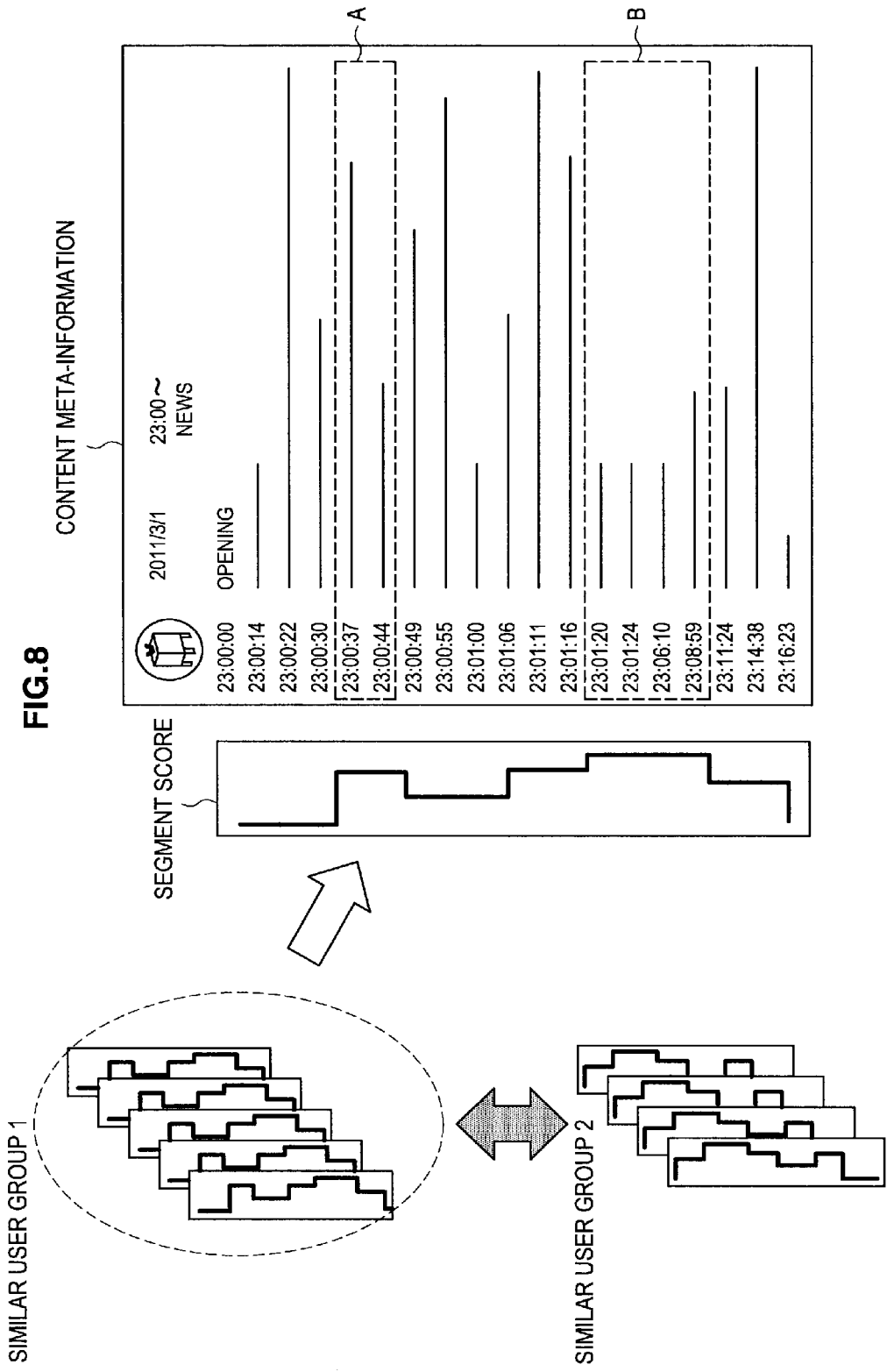
FIG. 8 is a diagram for conceptually describing creation of digest content in the first embodiment of the present disclosure.
Figure 9:
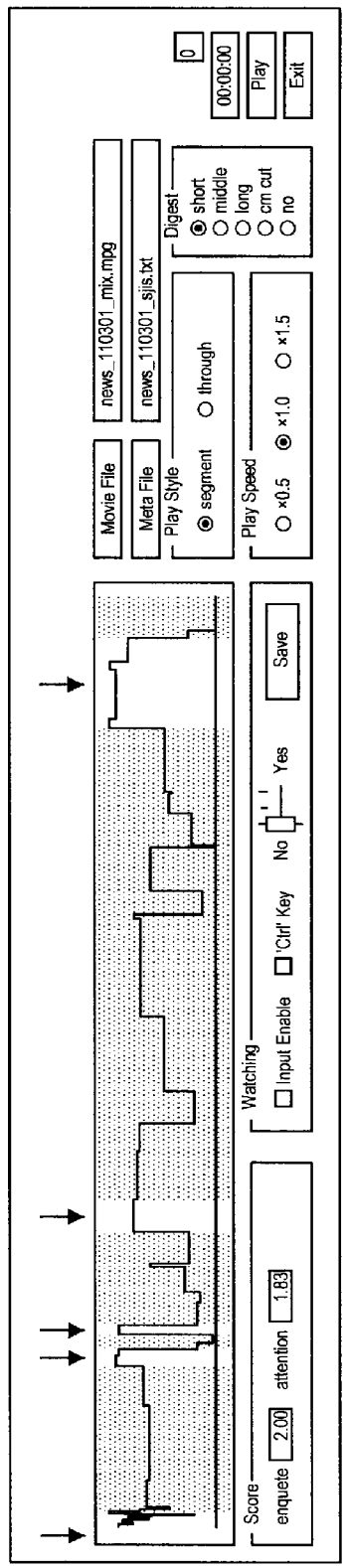
FIG. 9 is a diagram showing an example of an operation screen that is displayed for creation of digest content in the first embodiment of the present disclosure.

Next, a digest content creation process of the present embodiment will be described with reference to FIGS. 8 to 10. FIG. 8 is a diagram for conceptually describing creation of digest content in the present embodiment. FIG. 9 is a diagram showing an example of an operation screen that is displayed for creation of digest content in the present embodiment. FIG.

10 is a diagram showing another example of the operation screen that is displayed for creation of digest content in the present embodiment.

Referring to FIG. 8, a similar user group 1, a similar user group 2, a segment score and content meta-information are shown. The similar user group 1 and the similar user group 2 are each a group of users with similar tendencies of distributions of the degrees of attention, according to the collaborative filtering described above. The subject user of the priority information is assumed to be included in the similar user group 1. In this case, a segment score of the similar user group 1 is included in the priority information as the priority of the subject user. The segment score is a score showing the level of priority of each segment of content. The digest creation unit 109 creates digest content by extracting segments whose priorities indicated by the segment score are a predetermined value or higher. The digest creation unit 109 may also refer to content meta-information including the title of the content, date and time of broadcast, start/end time of each segment, the title of each segment and the like. In the example shown in the drawing, a segment group A and a segment group B are specified as the parts to be extracted for digest content creation.

Here, the user's main purpose for creating the digest content is to shorten the time or to reduce the file size. Thus, the digest content can be created in various modes. For example, the digest creation unit 109 may create the digest content in an image quality priority mode that extracts parts of content with high level of priority in such a way that the image quality is not sacrificed and the length is within a specified length. Also, the digest creation unit 109 may create the digest content in an information amount priority mode that extracts, into a specified file size, as many parts as possible by reducing the image quality of segments with low degree of attention to a predetermined image quality. Furthermore, the digest creation unit 109 may create the digest content in a degree-of-attention priority mode that deletes segments that are below a specified segment score, regardless of the length or the file size.

Besides the above, the digest creation unit 109 may create the digest content while reflecting various conditions set by an operation of the user. An example of an operation screen that is displayed for setting of conditions by an operation of the user will be described below.

In the example shown in FIG. 9, it is possible to select, on an operation screen, from among a case where content is viewed as it is without creation of digest content ("no" of Digest), a case where digest content, excluding only the commercial portions, is created ("cm cut" of Digest), a case where comparatively long digest content is created ("long" of Digest), a case where digest content with a medium length is created ("middle" of Digest), and a case where comparatively short digest content is created ("short" of Digest). Further, it is also possible to select, on the operation screen, from among a case where the speed of content viewing is normal (Play Speed is "×1.0"), a case where the speed of content viewing is made slower (Play Speed is "×0.5"), and a case where the speed of content viewing is made faster (Play Speed is "×1.5"). Parts in the drawing indicated by the arrows are parts to be extracted for creation of digest content after the length of digest content and the speed of content viewing have been selected. In this manner, the digest creation unit 109 may adjust parts to be extracted for creation of digest content according to conditions specified by an operation of the user.

Figure 10:
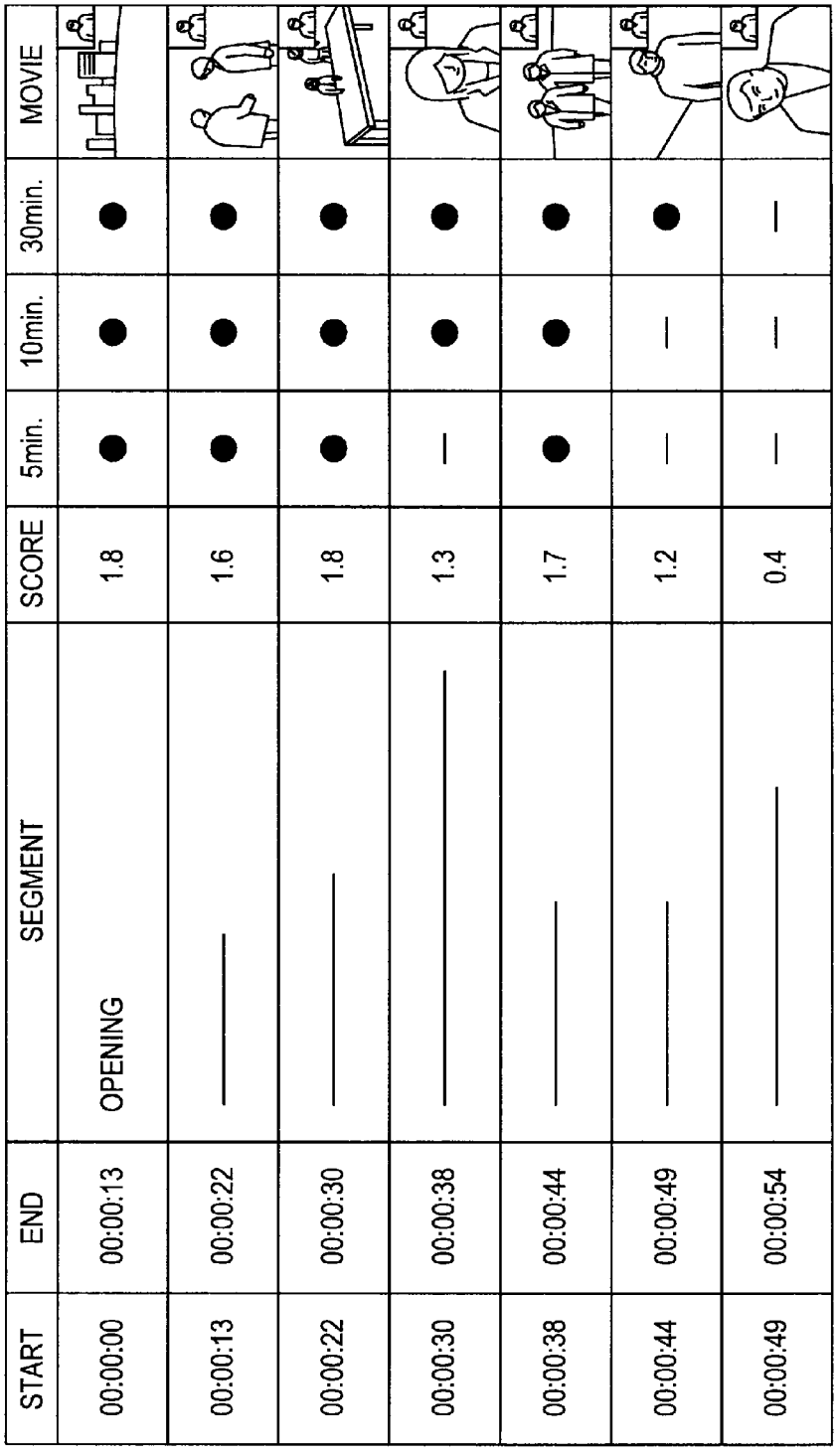
FIG. 10 is a diagram showing another example of the operation screen that is displayed for creation of digest content in the first embodiment of the present disclosure.

Further, in another example shown in FIG. 10, it is possible to select, on the operation screen, digest content from three lengths (comparatively short "Digest (5 min.)", a medium-length "Digest (10 min.)", and a comparatively long "Digest (30 min.)"). Also, a list of segments of content is displayed on the operation screen. This list includes items: a start time (START), an end time (END), a segment name (SEGMENT), a segment score (SCORE), which is a priority, display of whether each segment is included in a piece of digest content or not (5 min, 10 min., 30 min.), and a thumbnail image (MOVIE) selection of which causes a segment to be reproduced. With the information on each segment of content and the relation of each segment and digest content being displayed in this manner, the user is allowed to grasp parts of content included in various types of digest content and then to select digest content to be viewed. Additionally, a plurality of types (three in the example shown in the drawing) of digest content may be created in advance by the digest creation unit 109, or may be created by the digest creation unit 109 after the user has performed selection using the operation screen.

1-6. Modified Example

Figure 11:
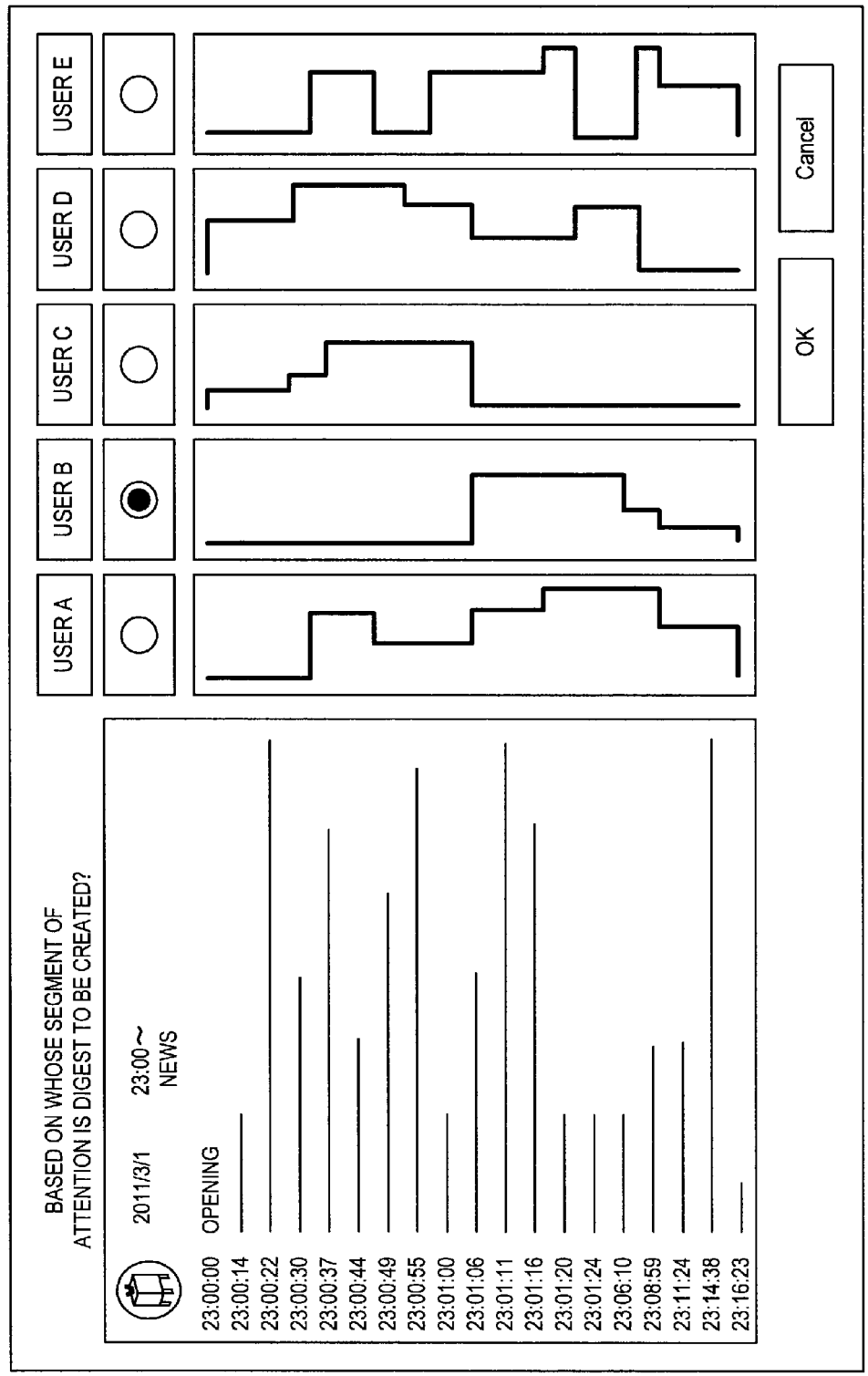
FIG. 11 is a diagram showing an example of an operation screen that is displayed in a modified example of the first embodiment of the present disclosure.
Figure 12:
FIG. 12 is a diagram showing another example of the operation screen that is displayed in the modified example of the first embodiment of the present disclosure.

Next, a modified example of the present embodiment will be described with reference to FIGS. 11 and 12. FIG. 11 is a diagram showing an example of an operation screen that is displayed in a modified example of the present embodiment. FIG. 12 is a diagram showing another example of the operation screen that is displayed in the modified example of the present embodiment.

In the modified example of the present embodiment, instead of assuming a user identified by the image processing unit 103 from an image of a face as a subject user, the request information generation unit 107 assumes a user specified by an operation of a user acquired via the input device of the client device 100 as a subject user, and generates request information. In this case, the subject user may be a user, different from the user operating the client device 100, who has already viewed subject content. Accordingly, priority information may include the information on the priority of this other user. Also, the digest creation unit 109 may create digest content according to the priority of this other user.

In the example shown in FIG. 11, segment scores of five users (user A, user B, user C, user D and user E) are displayed on the operation screen, together with segment information of content for which digest content is to be created. A user can select any of the five users who are displayed and view digest content that is in accordance with the degree of attention of the selected user.

Furthermore, in another example shown in FIG. 12, segment scores of five genres (general, economics, culture, society and art) are displayed on the operation screen, together with segment information of content for which digest content is to be created. The segment score of a genre may be created by totaling segment scores of each user based on a genre that each user has registered in advance and that the user himself/herself is highly interested in, for example. A user can select any of the five genres and view digest content that is in accordance with the degree of attention of a user who is highly interested in the selected genre.

1-7. Summary

According to the first embodiment, which has been described above, there is provided a server device which includes a communication unit for receiving from a client device degree-of-attention information including the degree of attention, for each part of first content, calculated based on the state of viewing of a user, and a priority information generation unit for generating, using the degree-of-attention information, priority information including information on a priority for viewing for each part of second content, where the communication unit transmits the priority information to the client device.

In this case, by calculating the priority for viewing for each part of content by using the degree-of-attention for each part of another piece of content, for example, the priority for viewing reflecting the level of interest of a user can be set for a wide range of content.

Furthermore, the communication unit may receive from the client device request information requesting provision of the priority information, the request information may include information on a subject user, and the priority information generation unit may generate the priority information including the information on a priority of the subject user, in response to the request information.

In this case, the priority information may be generated in accordance with the timing of viewing of content at the client device and may be provided to the client device, for example. Also, by a subject user being specified, the priority information particularly suitable for the user can be provided.

Furthermore, the subject user may be the user who has viewed the first content but not the second content.

In this case, appropriate priority information can be provided, with respect to content which has not been viewed by a user to whom the priority information is to be provided, by filtering of the degree-of-attention information of content which has been viewed by the user or by another user in the past.

Furthermore, the subject user may be the user who has viewed the second content.

In this case, priority information that is based on a content viewing result of an arbitrary user, such as a friend or a person interested in a particular genre, specified by a user who is to view content can be provided to the user, for example.

Additionally, at this time, the first content and the second content may indicate the same content. Also, a client device that provides the degree-of-attention information and a client device which is provided with the priority information may be different client devices.

Furthermore, the degree of attention may be calculated based on a movement of the user detected from an image of the user viewing the first content.

In this case, information on the degree of attention can be automatically acquired from an image of a user viewing content, for example, and the generated degree-of-attention information can be more easily collected.

The user may be identified based on a face included in the image.

In this case, a user can be automatically identified from an image of a user viewing content, for example, and the user's corresponding degree-of-attention information cam be more easily collected.

Furthermore, according to the first embodiment described above, there is provided a client device which includes a degree-of-attention information generation unit for generating degree-of-attention information including information on the degree of attention, for each part of first content, calculated based on the state of viewing of a user, and a communication unit for transmitting the degree-of-attention information to a server device, and receiving from the server device priority information, including information on a priority for viewing for each part of second content, generated using the degree-of-attention information.

In this case, by providing the degree of attention for each part of content which has been viewed and also by acquiring priority information, for content which has not been viewed, generated using the information on the degree of attention which has been provided, for example, the priority for viewing reflecting the level of interest of a user can be acquired for a wide range of content.

Also, the client device may further include a request information generation unit for generating request information requesting provision of the priority information, where the request information may include information on a subject user, and where the communication unit may transmit the request information to the server device, and receive from the server device the priority information, including the information on a priority of the subject user, generated in response to the request information.

In this case, the priority information may be acquired from the server device in accordance with the timing of viewing of content, for example. Also, by a subject user being specified, the priority information particularly suitable for the user can be acquired.

Furthermore, the client device may include a digest creation unit for creating digest content by extracting a part, of the second content, for which the priority is a predetermined value or higher, an output unit for outputting the digest content for viewing by the user, and an image acquisition unit for acquiring an image of the user viewing the digest content, where the request information generation unit may generate the request information, taking a user identified based on a face included in the image as a subject user.

In this case, digest content can be created by extracting parts with high level of priority for a viewing user, for example. Therefore, the digest content can be adapted in real time to suit the viewing user.

Also, the client device may further include an output unit for outputting the first content for viewing by the user, and an image acquisition unit for acquiring an image of the user viewing the first content, where the degree of attention may be calculated based on a movement of the user detected from the image.

In this case, the information on the degree of attention can be automatically generated from an image of a user viewing content, for example, and the degree-of-attention information can be easily generated.

Furthermore, the user may be identified based on a face included in the image.

In this case, a user can be automatically identified from an image of a user viewing content, for example, and a user's corresponding degree-of-attention information can be easily collected.

2. Second Embodiment

According to a second embodiment of the present disclosure, a user views content using a mobile device 300, which is a mobile phone or a tablet PC, for example. The mobile device 300 generates degree-of-attention information including information on the degree of attention for each part of content, based on the state of viewing of the user, and, when connected to a client device 600, transmits the degree-of-attention information to the server device 200 via the client device 600. The server device 200 stores the received degree-of-attention information in a database.

Also, the client device 600 generates, for content to be viewed by the user using the connected mobile device 300, request information requesting provision of priority information including information on a priority for viewing for each part of content, and transmits the same to the server device 200. The server device 200 generates the priority information using the degree-of-attention information stored in the database, in response to the received request information, and transmits the same to the client device 600. The client device 600 transfers the received priority information to the mobile device 300. The mobile device 300 generates, by using the priority information which has been transferred, digest content obtained by extracting parts, of content, with high priorities, for example, and provides it to the user.

Additionally, the present embodiment differs from the first embodiment described above in that a user views content using the mobile device 300 and in that the client device 600 generates the request information for the mobile device 300 and transfers the priority information to the mobile device 300. The present embodiment is approximately the same in other aspects as the first embodiment described above, and therefore, a detailed explanation is omitted.

2-1. Functional Configuration (Mobile Device)

Figure 13:
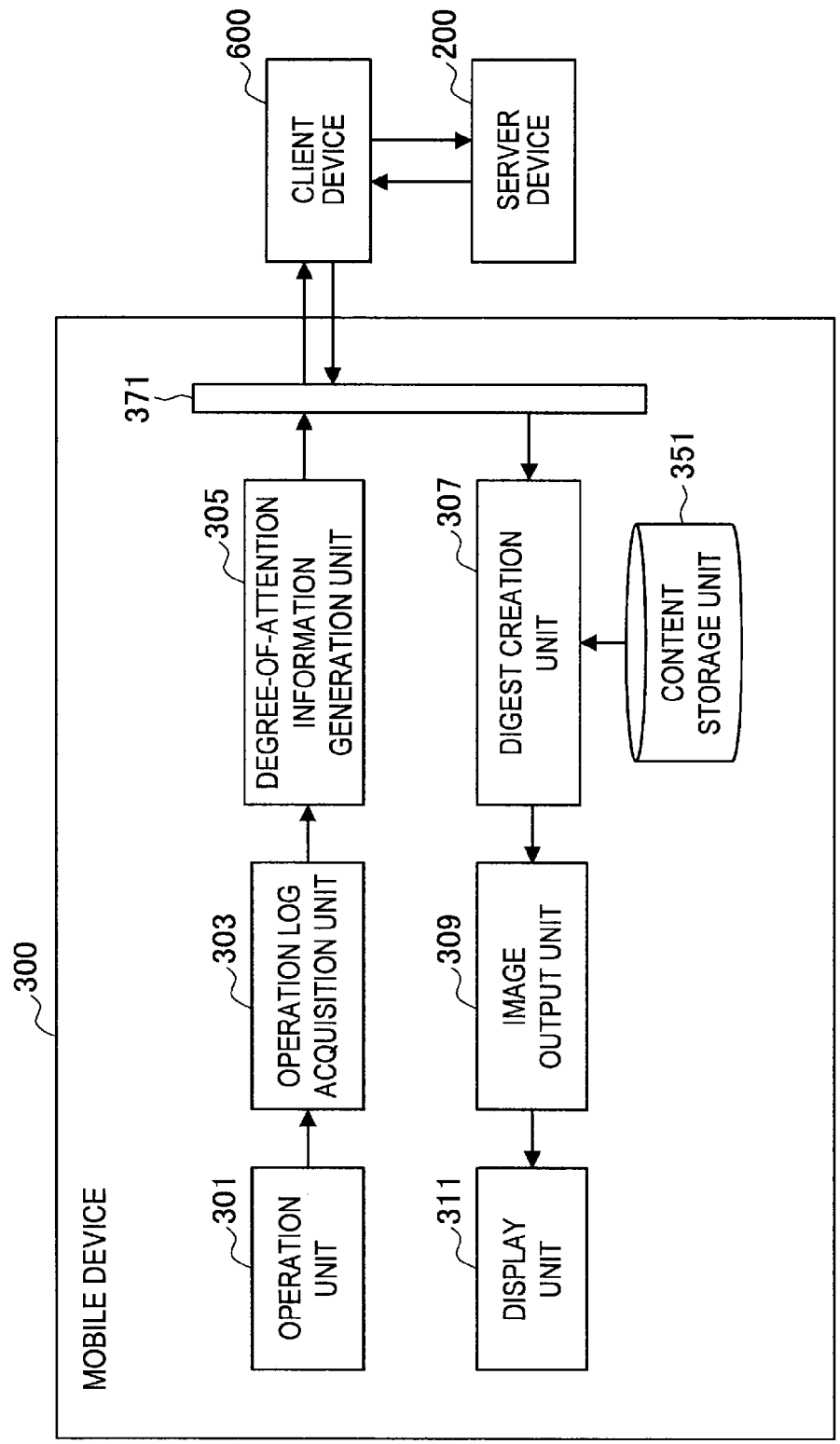
FIG. 13 is a block diagram showing a functional configuration of a mobile device according to a second embodiment of the present disclosure.

First, a schematic functional configuration of the mobile device 300 according to the second embodiment of the present disclosure will be described with reference to FIG. 13. FIG. 13 is a block diagram showing a functional configuration of the mobile device 300.

The mobile device 300 is an example of an information processing apparatus according to the present disclosure, and includes an operation unit 301, an operation log acquisition unit 303, a degree-of-attention information generation unit 305, a digest creation unit 307, an image output unit 309, a display unit 311, a content storage unit 351 and a communication unit 371. The mobile device 300 is realized as a mobile appliance having a content playback function, such as an mobile phone or a tablet PC, for example.

The operation unit 301 is realized by an input device, for example. The operation unit 301 accepts an operation of a user for viewing of content. An operation of a user for viewing of content may be an operation such as play, stop, pause, fast-forward, rewind, skip or the like, for example. A log of operation accepted by the operation unit 301 is acquired by the operation log acquisition unit 303.

The operation log acquisition unit 303 is realized by a CPU, a ROM and a RAM, for example. The operation log acquisition unit 303 acquires a log of operation, accepted by the operation unit 301, for content viewing by the user. The operation log acquisition unit 303 acquires, as the log, at which part of content operations of fast-forward and skip have been performed by the user, for example. The operation log acquisition unit 303 outputs the acquired log of operation to the degree-of-attention information generation unit 305.

The degree-of-attention information generation unit 305 is realized by a CPU, a ROM and a RAM, for example. The degree-of-attention information generation unit 305 generates, using the log of operation provided by the operation log acquisition unit 303, degree-of-attention information including information on the degree of attention, for each part of content, calculated based on the state of viewing of a user. For example, the degree-of-attention information generation unit 305 determines that the degree of attention of a user is comparatively low for a part of content which is indicated by the log of operation to have been fast-forwarded or skipped. The degree-of-attention information generation unit 305 may acquire content information of content which has been viewed by a user, and average the degrees of attention for each segment of content. Information specifying a user and content is included in the degree-of-attention information. Here, the information specifying a user is acquired from owner information of the mobile device 300. The generated degree-of-attention information is provided to the communication unit 371.

The communication unit 371 is realized by a connection port and a communication device, for example. The communication unit 371 communicates with the client device 600, and transmits the degree-of-attention information generated by the degree-of-attention information generation unit 305. The degree-of-attention information is further transferred from the client device 600 to the server device 200. Further, the communication unit 371 receives priority information from the client device 600. The priority information is information including information on a priority for viewing for each part of content, and is generated by the server device 200 and transmitted to the client device 600. The communication unit 371 provides the received priority information to the digest creation unit 307.

The digest creation unit 307 is realized by a CPU, a ROM and a RAM, for example. The digest creation unit 307 acquires the priority information that the communication unit 371 has received from the client device 600 and extracts a part, of the content, whose degree of priority is a predetermined value or higher by using the acquired priority information, and thereby creates digest content. The digest creation unit 307 acquires content data of subject content of the priority information from the content storage unit 351. Also, the digest creation unit 307 provides the created digest content to the image output unit 309. For example, the digest creation unit 307 may automatically create the digest content when the priority information is provided by the communication unit 371. Also, the digest creation unit 307 may create the digest content according to an operation of a user acquired via an input device of the client device 600. In this case, the digest creation unit 307 may be able to create a plurality of types of digest content, depending on the designated length of digest content, for example.

The image output unit 309 is realized by a CPU, a GPU, a ROM and a RAM, for example. The image output unit 309 outputs an image of the digest content provided by the digest creation unit 307 to the display unit 311. Also, the image output unit 309 may acquire data of normal content, which is not digest content, from the content storage unit 351, and output the same to the display unit 311. The image output unit 309 may output to the display unit 311 an image of an operation screen that is used by a user for operation of the mobile device 300. The operation screen may present the priority information acquired by the communication unit 371 to the user, for example.

The display unit 311 is realized by an LCD (Liquid Crystal Display) or an organic EL (Electro-Luminescence) display, for example. The display unit 311 displays an image provided by the image output unit 309.

The content storage unit 351 is realized by a ROM, a RAM and a storage device, for example. Data of content that the mobile device 300 provides to a user is stored in the content storage unit 351. The data of content may be acquired from airwaves by using a tuner that is not shown in the drawing, or may be downloaded from a communication network via a communication device.

(Client Device)

Figure 14:
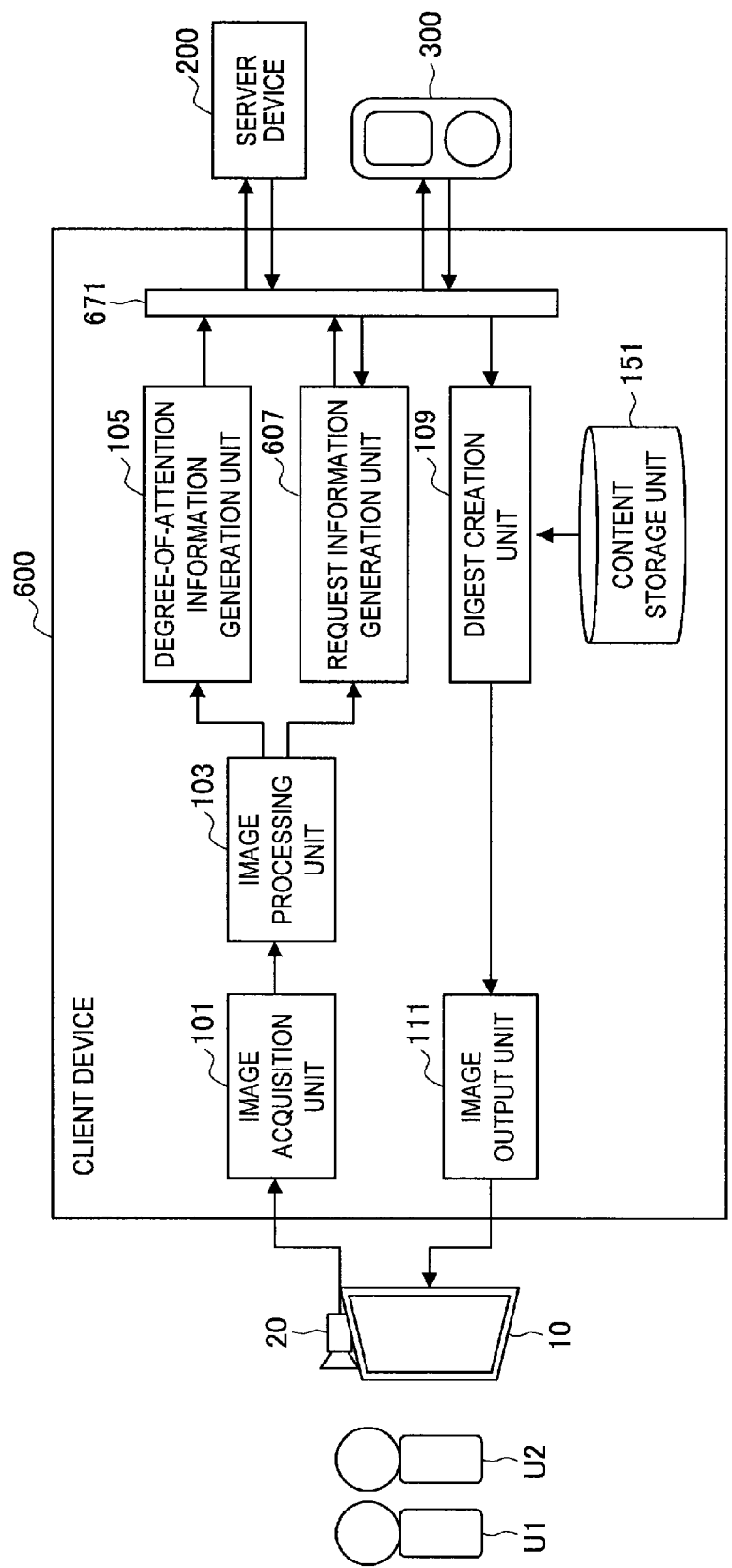
FIG. 14 is a block diagram showing a functional configuration of a client device according to the second embodiment of the present disclosure.

Next, a schematic functional configuration of the client device 600 according to the second embodiment of the present disclosure will be described with reference to FIG. 14. FIG. 14 is a block diagram showing a functional configuration of the client device 600. The client device 600 has a functional configuration that is approximately the same as the client device 100 according to the first embodiment except for a request information generation unit 607 and a communication unit 671, and therefor, a detailed explanation is omitted for the approximately same parts.

The request information generation unit 607 has, in addition to or instead of the function of the request information generation unit 107 of the client device 100 according to the first embodiment, a function of generating request information taking a user who is to view content using the mobile device 300 as a subject user. The request information generation unit 607 acquires owner information of the mobile device 300 that the communication unit 671 has received, and sets request information taking a user identified based on the owner information as the subject user. The generated request information is provided to the communication unit 671, and is transmitted from the communication unit 671 to the server device 200.

The communication unit 671 has, in addition to the function of the communication unit 171 of the client device 100 according to the first embodiment, a function of communicating with the mobile device 300. The communication unit 671 receives degree-of-attention information from the mobile device 300, and transfers the same to the server device 200. Also, the communication unit 671 receives owner information of the mobile device 300 from the mobile device 300, and provides the same to the request information generation unit 607. The communication unit 671 transmits to the server device 200 request information generated by the request information generation unit 607. Furthermore, the communication unit 671 receives priority information from the server device 200, and transfers the same to the mobile device 300.

2-2. Process Flow

Figure 15:
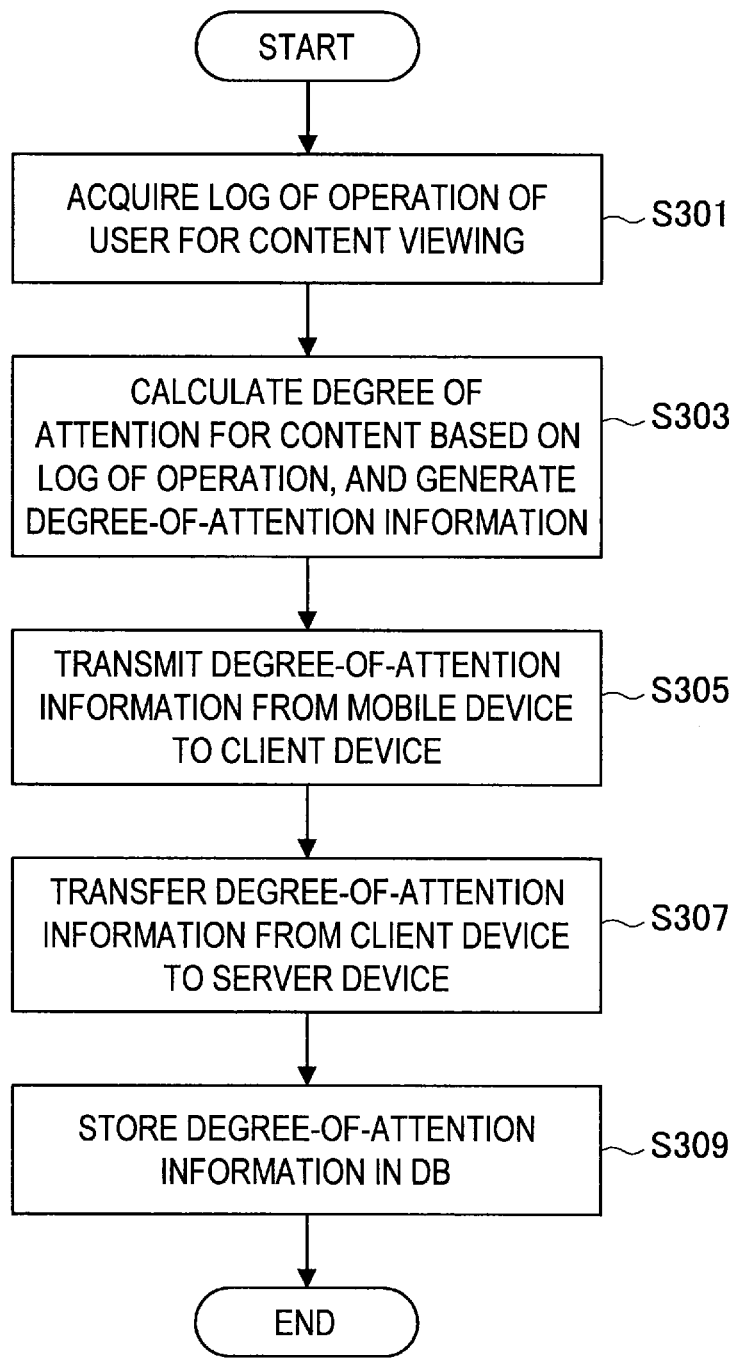
FIG. 15 is a flow chart showing an example of processing performed, in the second embodiment of the present disclosure, when normally viewing content.
Figure 16:
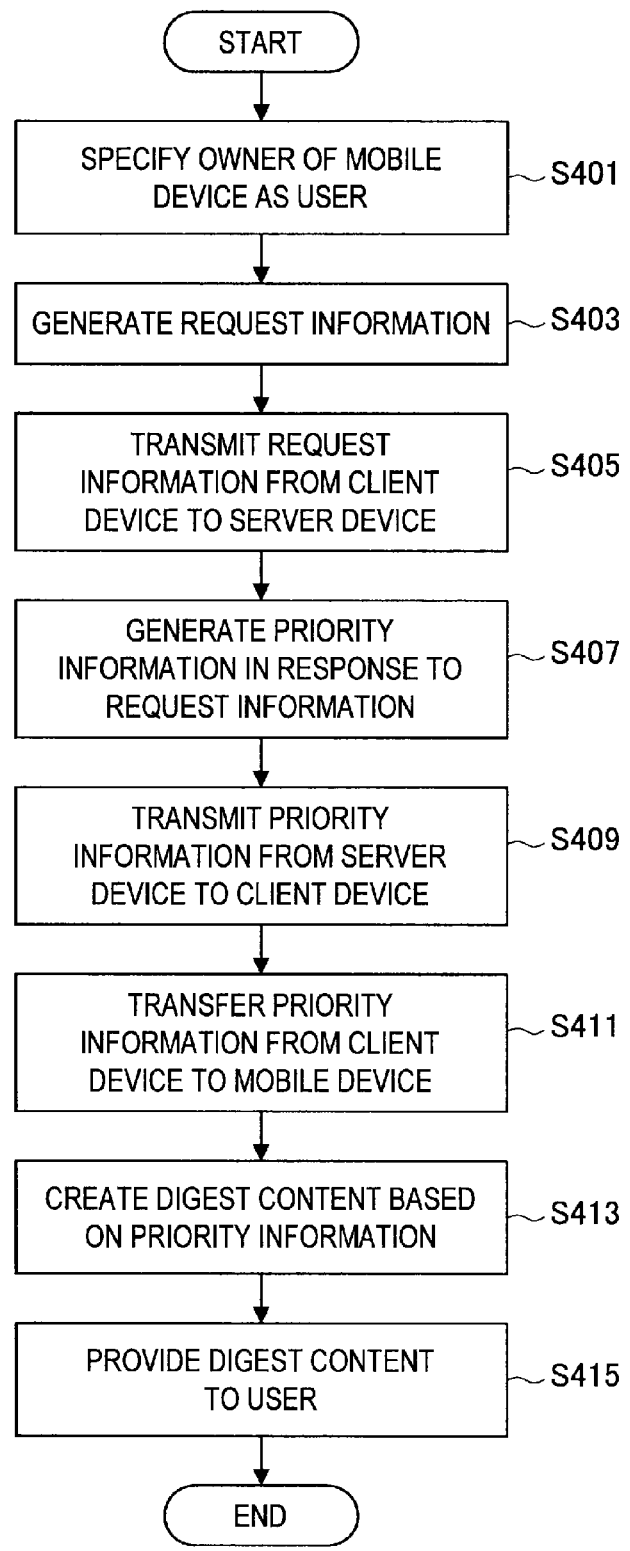
FIG. 16 is a flow chart showing an example of processing performed, in the second embodiment of the present disclosure, when digest viewing content.

Next, examples of a process flow of the second embodiment of the present disclosure will be described with reference to FIGS. 15 and 16. FIG. 15 is a flow chart showing an example of processing that is performed when a user views content in a normal manner using the mobile device 300. FIG. 16 is a flow chart showing an example of processing that is performed when a user views content in a digest manner using the mobile device 300.

(Process at the Time of Normal Viewing of Content)

Referring to FIG. 15, first, the operation log acquisition unit 303 of the mobile device 300 acquires a log of operation of a user for content viewing (step S301). As described above, a log of operation is a log of operation performed at the time of a user viewing content displayed on the display unit 311 of the mobile device 300, such as play, fast-forward, skip or the like.

Next, the degree-of-attention information generation unit 305 of the mobile device 300 calculates the degree of attention for each part of content based on the log of operation, and generates the degree-of-attention information (step S303). Here, the degree-of-attention information generation unit 305 calculates the degree of attention by determining, for example, that the degree of attention is low for a part which has been fast-forwarded or skipped, based on the log of operation. The degree-of-attention information includes, in addition to the degree of attention which has been calculated, content information specifying the content the user has viewed and a user ID specifying the user.

Then, the communication unit 371 of the mobile device 300 transmits the generated degree-of-attention information to the client device 600 (step S305). The degree-of-attention information may be collectively transmitted from the mobile device 300 to the client device 600 after the user has finished viewing the content, or may be transmitted every time the degree of attention is calculated for a segment of the content, for example.

Next, the communication unit 671 of the client device 600 transfers the degree-of-attention information received from the mobile device 300 to the server device 200 (step S307).

Next, the communication unit 271 of the server device 200 receives the degree-of-attention information from the client device 600, and the degree-of-attention information acquisition unit 201 acquires the received degree-of-attention information and stores the same in the DB 251 for degree of attention (step S309). The degree-of-attention information may be acquired for a plurality of users with respect to a plurality of pieces of content.

(Process at the Time of Digest Viewing)

Referring to FIG. 16, first, the communication unit 671 of the client device 600 receives owner information of the mobile device 300 from the mobile device 300, and the request information generation unit 607 identifies the owner of the mobile device 300 as the user, based on the received owner information (step S401).

Next, the communication unit 671 of the client device 600 generates request information (step S403). The request information includes, as the user ID of a subject user, the user ID of the user who has been identified based on the owner information of the mobile device 300. Also, content information specifying content which the user intends to view on the mobile device 300 is also included.

Then, the communication unit 671 of the client device 600 transmits the request information to the server device 200 (step S405). The request information may be transmitted to the server device 200 by a separate operation of the user acquired via the input device of the client device 600, or may be automatically transmitted to the server device 200 with the connection of the mobile device 300 to the client device 600 as the trigger, for example.

Subsequently, the priority information generation unit 203 of the server device 200 receives the request information from the client device 600 via the communication unit 271, and generates priority information in response to the acquired request information (step S407). The priority information generation unit 203 uses the degree-of-attention information stored in the DB 251 for degree of attention to generate the priority information. The priority included in the priority information that is generated here is the priority of a user who is specified by the user ID of the subject user included in the request information. Furthermore, the content which is the subject of the priority information is content that is specified by the content information included in the request information.

Next, the communication unit 271 of the server device 200 transmits the generated priority information to the client device 600 (step S409). In the present embodiment, the priority information is generated in response to the request information from the client device 600, and thus the generated priority information can be automatically transmitted to the client device 600.

Then, the communication unit 671 of the client device 600 transfers the degree-of-attention information received from the server device 200 to the mobile device 300 (step S411).

Next, the digest creation unit 307 of the mobile device 300 acquires the priority information from the client device 600 via the communication unit 371, and creates digest content based on the acquired priority information (step S413). The digest content here may be automatically created when the priority information is acquired. Also, the digest content may be created according to conditions, such as a length specified by an operation of the user acquired via the input device of the client device 100.

Next, the image output unit 309 of the mobile device 300 outputs the digest content to the display unit 311, and provides the same to the user (step S415).

2-3. Modified Example

Next, a modified example of the present embodiment will be described. According to a modified example of the present embodiment, the communication unit 371 of the mobile device 300 directly communicates with the communication unit 271 of the server device 200 by wireless communication or the like. In this case, request information requesting priority information is generated not by the client device 600 but by the mobile device 300. That is, in the modified example, the mobile device 300 includes a request information generation unit that is similar to the request information generation unit 607 of the client device 600 described above. Also, the communication unit 371 of the mobile device 300 transmits degree-of-attention information and the request information to the server device 200, and receives priority information from the server device 200.

Additionally, in this modified example, since the client device 600 does not have to communicate with the mobile device 300, it may have substantially the same functional configuration as the client device 100 of the first embodiment described above, for example, or it does not have to exist.

2-4. Summary

According to the second embodiment described above, there is provided a server device which includes a communication unit for receiving from a mobile device (via a client device, if necessary) degree-of-attention information including the degree of attention, for each part of first content, calculated based on the state of viewing, on a mobile device, of a user, and a priority information generation unit for generating, using the degree-of-attention information, priority information including information on a priority for viewing for each part of second content, where the communication unit transmits the priority information to the mobile device (via the client device, if necessary), and where the degree of attention is calculated based on a log of operation of the user for the mobile device.

In this case, by calculating the degree of attention, regarding viewing, for each part of content by using the degree of attention of a user calculated based on the state of fast-forwarding or skipping at a mobile device, for example, the priority for viewing reflecting the level of interest of the user at the time of mobile viewing can be set for a wide range of content.

Also, a user may be identified from owner information of the mobile device.

In this case, the user can be automatically identified from the owner information of the mobile device, and the user's corresponding degree-of-attention information can be easily collected, or the degree-of-attention information particularly suitable to the user can be provided, for example.

Furthermore, according to the second embodiment described above, there is provided a mobile device which includes a degree-of-attention information generation unit for generating degree-of-attention information including information on the degree of attention, for each part of first content, calculated based on the state of viewing of a user, and a communication unit for transmitting the degree-of-attention information to a server device (via a client device, if necessary), and receiving from the server device (via the client device, if necessary) priority information, including information on a priority for viewing for each part of second content, generated using the degree-of-attention information, where the mobile device further includes an output unit for outputting the first content for viewing by the user, and an operation log acquisition unit for acquiring a log of operation of the user for viewing of the first content, where the degree of attention is calculated based on the log of operation.

In this case, by calculating the degree of attention, regarding viewing, for each part of content by using the degree of attention of a user calculated based on the state of fast-forwarding or skipping at a mobile device, for example, the priority for viewing reflecting the level of interest of the user at the time of mobile viewing can be set for a wide range of content.

Furthermore, the user may be identified from owner information of the mobile device.

In this case, the user can be automatically identified from the owner information of the mobile device, and the user's corresponding degree-of-attention information can be easily provided, or the degree-of-attention information particularly suitable to the user can be acquired, for example.

3. Hardware Configuration

Next, a hardware configuration of an information processing apparatus 900 that realizes the functions of the client devices 100 and 600, the server devices 200 and 700, and the mobile device 300 according to respective embodiments described above will be described in detail with reference to FIG. 17. FIG. 17 is a block diagram for describing a hardware configuration of the information processing apparatus 900 according to each of the embodiments.

The information processing apparatus 900 includes a CPU 901, a ROM 903, and a RAM 905. Furthermore, the information processing apparatus 900 may also include a host bus 907, a bridge 909, and external bus 911, an interface 913, an input device 915, an output device 917, a storage device 919, a drive 921, a connection port 923, and a communication device 925.

The CPU 901 functions as a processing device and a control device, and controls the overall operation or a part of the operation of the information processing apparatus 900 according to various programs recorded in the ROM 903, the RAM 905, the storage device 919 or a removable recording medium 927. The ROM 903 stores programs to be used by the CPU 901, processing parameters and the like. The RAM 905 temporarily stores programs to be used in the execution of the CPU 901, parameters that vary in the execution, and the like. The CPU 901, the ROM 903 and the RAM 905 are connected to one another through the host bus 907 configured by an internal bus such as a CPU bus.

The host bus 907 is connected to the external bus 911 such as a PCI (Peripheral Component Interconnect/Interface) bus via the bridge 909.

The input device 915 is input means to be operated by a user, such as a mouse, a keyboard, a touch panel, a button, a switch, a lever or the like. Further, the input device 915 may be remote control means that uses an infrared or another radio wave, or it may be an externally-connected appliance 929 such as a mobile phone, a PDA or the like conforming to the operation of the information processing apparatus 900. Furthermore, the input device 915 is configured from an input control circuit or the like for generating an input signal based on information input by a user with the operation means described above and outputting the signal to the CPU 901. A user of the information processing apparatus 900 can input various kinds of data to the information processing apparatus 900 or instruct the information processing apparatus 900 to perform processing, by operating the input device 915.

The output device 917 is configured from a device that is capable of visually or auditorily notifying a user of acquired information. Examples of such device include a display device such as a CRT display device, a liquid crystal display device, a plasma display device, an EL display device or a lamp, an audio output device such as a speaker or a headphone, a printer, a mobile phone, a facsimile and the like. The output device 917 outputs results obtained by various processes performed by the information processing apparatus 900, for example. To be specific, the display device displays, in the form of text or image, results obtained by various processes performed by the information processing apparatus 900. On the other hand, the audio output device converts an audio signal such as reproduced audio data or acoustic data into an analogue signal, and outputs the analogue signal.

The storage device 919 is a device for storing data configured as an example of a storage unit of the information processing apparatus 900. The storage device 919 is configured from, for example, a magnetic storage device such as a HDD (Hard Disk Drive), a semiconductor storage device, an optical storage device, or a magneto-optical storage device. This storage device 919 stores programs to be executed by the CPU 901, various types of data, and various types of data obtained from the outside, for example.

The drive 921 is a reader/writer for a recording medium, and is incorporated in or attached externally to the information processing apparatus 900. The drive 921 reads information recorded in the attached removable recording medium 927 such as a magnetic disk, an optical disk, a magneto-optical disk, or a semiconductor memory, and outputs the information to the RAM 905. Furthermore, the drive 921 can write in the attached removable recording medium 927 such as a magnetic disk, an optical disk, a magneto-optical disk, or a semiconductor memory. The removable recording medium 927 is, for example, a DVD medium, an HD-DVD medium, or a Blu-ray (registered trademark) medium. The removable recording medium 927 may be a CompactFlash (CF; registered trademark), a flash memory, an SD memory card (Secure Digital Memory Card), or the like. Alternatively, the removable recording medium 927 may be, for example, an electronic appliance or an IC card (Integrated Circuit Card) equipped with a non-contact IC chip.

The connection port 923 is a port for allowing devices to directly connect to the information processing apparatus 900. Examples of the connection port 923 include a USB (Universal Serial Bus) port, an IEEE 1394 port, a SCSI (Small Computer System Interface) port, and the like. Other examples of the connection port 923 include an RS-232C port, an optical audio terminal, an HDMI (High-Definition Multimedia Interface) port, and the like. With the externally connected apparatus 929 connected to this connection port 923, the information processing apparatus 900 directly obtains various types of data from the externally connected apparatus 929, and provides various types of data to the externally connected apparatus 929.

The communication device 925 is a communication interface configured from, for example, a communication device for connecting to a communication network 931. The communication device 925 is, for example, a wired or wireless LAN (Local Area Network), a Bluetooth (registered trademark), a communication card for WUSB (Wireless USB), or the like. Alternatively, the communication device 925 may be a router for optical communication, a router for ADSL (Asymmetric Digital Subscriber Line), a modem for various communications, or the like. This communication device 925 can transmit and receive signals and the like in accordance with a predetermined protocol, such as TCP/IP, on the Internet and with other communication devices, for example. The communication network 931 connected to the communication device 925 is configured from a network or the like connected via wire or wirelessly, and may be, for example, the Internet, a home LAN, infrared communication, radio wave communication, satellite communication or the like.

Heretofore, an example of the hardware configuration of the information processing apparatus 900 has been shown. Each of the structural elements described above may be configured using a general-purpose material, or may be configured from hardware dedicated to the function of each structural element. Accordingly, the hardware configuration to be used can be changed as appropriate according to the technical level at the time of carrying out each of the embodiments described above.

4. Supplement

Functional configurations of the client device, the server device and the mobile device have been described in each of the embodiments described above, but the present technology is not limited to those examples. For example, generation of the degree-of-attention information and generation of the request information may be performed by the server device. Up to which process is to be performed by which device with respect to the process of generating the degree-of-attention information from the state of viewing and the process of generating the priority information from the accumulated pieces of degree-of-attention information can be appropriately set as necessary.

Additionally, the present technology may also be configured as below.

(1) An information processing apparatus including:
a communication unit for receiving, from an external device, degree-of-attention information including information on a degree of attention, for each part of first content, calculated based on a state of viewing of a user; and
a priority information generation unit for generating, using the degree-of-attention information, priority information including information on a priority for viewing for each part of second content,
wherein the communication unit transmits the priority information to the external device.

(2) The information processing apparatus according to (1) described above,
wherein the communication unit receives, from the external device, request information requesting provision of the priority information,
wherein the request information includes information on a subject user, and
wherein the priority information generation unit generates the priority information including the information on a priority of the subject user, in response to the request information.

(3) The information processing apparatus according to (2) described above, wherein the subject user is the user who has viewed the first content but not the second content.

(4) The information processing apparatus according to (2) described above, wherein the subject user is the user who has viewed the second content.

(5) The information processing apparatus according to any one of (1) to (4) described above, wherein the degree of attention is calculated based on a movement of the user detected from an image of the user viewing the first content.

(6) The information processing apparatus according to (5) described above, wherein the user is identified based on a face included in the image.

(7) The information processing apparatus according to any one of (1) to (4) described above, wherein the degree of attention is calculated based on a log of operation, of a device, of the user for viewing of the first content.

(8) The information processing apparatus according to (7) described above, wherein the user is identified from owner information of the device.

(9) An information processing apparatus including:
a degree-of-attention information generation unit for generating degree-of-attention information including information on a degree of attention, for each part of first content, calculated based on a state of viewing of a user; and
a communication unit for transmitting the degree-of-attention information to an external device, and receiving, from the external device, priority information, including information on a priority for viewing for each part of second content, generated using the degree-of-attention information.

(10) The information processing apparatus according to (9) described above, further including:
a request information generation unit for generating request information requesting provision of the priority information,
wherein the request information includes information on a subject user, and
wherein the communication unit transmits the request information to the external device, and receives, from the external device, the priority information, including the information on a priority of the subject user, generated in response to the request information.

(11) The information processing apparatus according to (10) described above, further including:
a digest creation unit for creating digest content by extracting a part, of the second content, for which the priority is a predetermined value or higher;
an output unit for outputting the digest content for viewing by the user; and
an image acquisition unit for acquiring an image of the user viewing the digest content,
wherein the request information generation unit generates the request information, taking a user identified based on a face included in the image as a subject user.

(12) The information processing apparatus according to any one of (9) to (11) described above, further including:
an output unit for outputting the first content for viewing by the user; and
an image acquisition unit for acquiring an image of the user viewing the first content,
wherein the degree of attention is calculated based on a movement of the user detected from the image.

(13) The information processing apparatus according to (12) described above, wherein the user is identified based on a face included in the image.

(14) The information processing apparatus according to (9) described above, further including:
an output unit for outputting the first content for viewing by the user; and
an operation log acquisition unit for acquiring a log of operation of the user for viewing of the first content,
wherein the degree of attention is calculated based on the log of operation.

(15) The information processing apparatus according to (14) described above, wherein the user is identified from owner information of the information processing apparatus.

(16) An information processing method including:
receiving, from an external device, degree-of-attention information including information on a degree of attention, for each part of first content, calculated based on a state of viewing of a user;
generating, using the degree-of-attention information, priority information including information on a priority for viewing for each part of second content; and
transmitting the priority information to the external device.

(17) An information processing method including:
generating degree-of-attention information including information on a degree of attention, for each part of first content, calculated based on a state of viewing of a user;
transmitting the degree-of-attention information to an external device; and
receiving, from the external device, priority information, including information on a priority for viewing for each part of second content, generated using the degree-of-attention information.

(18) A program for causing a computer to function as:
a communication unit for receiving, from an external device, degree-of-attention information including information on a degree of attention, for each part of first content, calculated based on a state of viewing of a user; and
a priority information generation unit for generating, using the degree-of-attention information, priority information including information on a priority for viewing for each part of second content,
wherein the communication unit transmits the priority information to the external device.

(19) A program for causing a computer to function as:
a degree-of-attention information generation unit for generating degree-of-attention information including information on a degree of attention, for each part of first content, calculated based on a state of viewing of a user; and
a communication unit for transmitting the degree-of-attention information to an external device, and receiving, from the external device, priority information, including information on a priority for viewing for each part of second content, generated using the degree-of-attention information.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus comprising:
processing circuitry configured to
store first information indicating a degree of attention for a segment of a first content based on a state of viewing of a first user and a second user,
store second information indicating a degree of attention for a segment of a second content based on a state of viewing of the first user, and
generate priority information identifying segments of the second content of interest to the second user based on a comparison between the first and the second information.

2. The information processing apparatus according to claim 1, wherein the processing circuitry updates the priority information based on at least one of an operation history and a viewing history.

3. The information processing apparatus according to claim 1, wherein the processing circuitry updates the priority information based on operation history and viewing history.

4. The information processing apparatus according to claim 1, wherein the second user is a user who has not viewed the second content.

5. The information processing apparatus according to claim 1, wherein the degree of attention is calculated based on a movement of the first user detected from an image of the first user viewing the first content.

6. The information processing apparatus according to claim 5, wherein the first user is identified based on a face included in the image.

7. The information processing apparatus according to claim 1, wherein the degree of attention is calculated based on a log of operation, of a device, of the first user for viewing of the first content.

8. The information processing apparatus according to claim 7, wherein the first user is identified from owner information of the device.

9. The information processing apparatus according to claim 1, wherein the processing circuitry is further configured to generate, using the first information and second information, the priority information, the priority information including information identifying out of a plurality of segments of a second content particular segments of interest to the second user based on a comparison between the first information and the second information.

10. The information processing apparatus according to claim 1, wherein the processing circuitry is configured to generate the priority information by calculating a similarity between the first information and the second information.

11. The information processing apparatus according to claim 10, wherein the processing circuitry is further configured to store third information indicating a third degree of attention, for each part of first content, calculated based on a state of viewing of a plurality of users.

12. An information processing method comprising:
storing, in memory, first information indicating a degree of attention for a segment of a first content based on a state of viewing of a first user and a second user;
storing, in the memory, second information indicating a degree of attention for a segment of a second content based on a state of viewing of the first user;
generating, by processing circuitry, priority information identifying segments of the second content of interest to the second user based on a comparison between the first and the second information.

13. A non-transitory computer readable medium including computer executable instructions, wherein the instructions, when executed by a computer, cause the computer to perform a method, the method comprising:
storing first information indicating a degree of attention for a segment of a first content based on a state of viewing of a first user and a second user;
storing second information indicating a degree of attention for a segment of a second content based on a state of viewing of the first user;
generating priority information identifying segments of the second content of interest to the second user based on a comparison between the first and the second information.

* * * * *